US007940241B2

(12) United States Patent
Bae et al.

(10) Patent No.: US 7,940,241 B2
(45) Date of Patent: May 10, 2011

(54) DISPLAY APPARATUS WITH FRAME RATE CONTROLLERS GENERATING MOTION INTERPOLATED INTERMEDIATE IMAGE BASED ON IMAGE INFORMATION FROM ADJACENT FRAME RATE CONTROLLER

(75) Inventors: Jae-Sung Bae, Cheonan-si (KR); Jung-Hwan Cho, Goyang-si (KR); Bong-Hyun You, Yongin-si (KR); Jun-Pyo Lee, Cheonan-si (KR); Jung-Won Kim, Seoul (KR); Sang-Soo Kim, Seoul (KR); Seon-Ki Kim, Anyang-si (KR); Hee-Jin Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 12/424,306

(22) Filed: Apr. 15, 2009

(65) Prior Publication Data

US 2009/0322661 A1 Dec. 31, 2009

(30) Foreign Application Priority Data

Jun. 25, 2008 (KR) ........................ 10-2008-0060399

(51) Int. Cl.
*G09G 3/36* (2006.01)
*H04N 7/015* (2006.01)

(52) U.S. Cl. .......... 345/98; 345/204; 345/545; 348/441; 348/459

(58) Field of Classification Search .................. 345/204, 345/98, 545–546; 348/441, 459, 668
See application file for complete search history.

(56) References Cited

U.S. PATENT DOCUMENTS

| | | | | |
|---|---|---|---|---|
| 5,812,704 | A * | 9/1998 | Pearson et al. | 382/284 |
| 7,034,791 | B1 * | 4/2006 | Odom | 345/98 |
| 2007/0008348 | A1 * | 1/2007 | Nishi et al. | 345/698 |
| 2007/0133685 | A1 * | 6/2007 | Seong et al. | 375/240.16 |
| 2007/0165953 | A1 * | 7/2007 | Kim et al. | 382/199 |
| 2007/0285349 | A1 * | 12/2007 | Hong et al. | 345/38 |
| 2008/0239143 | A1 * | 10/2008 | Shin et al. | 348/416.1 |
| 2008/0317128 | A1 * | 12/2008 | Zhou et al. | 375/240.16 |
| 2009/0122188 | A1 * | 5/2009 | Hanaoka et al. | 348/459 |
| 2010/0002133 | A1 * | 1/2010 | Ueno et al. | 348/452 |
| 2010/0128169 | A1 * | 5/2010 | Yi et al. | 348/441 |

FOREIGN PATENT DOCUMENTS

| | | |
|---|---|---|
| JP | 11-338424 | 12/1999 |
| JP | 2007267360 | 10/2007 |
| JP | 2007-329952 | 12/2007 |
| KR | 1020070071701 | 7/2007 |
| KR | 1020080021473 | 3/2008 |
| KR | 1020080023604 | 3/2008 |

* cited by examiner

*Primary Examiner* — Richard Hjerpe
*Assistant Examiner* — Dorothy Harris
(74) *Attorney, Agent, or Firm* — H.C. Park & Associates, PLC

(57) ABSTRACT

A display apparatus includes a plurality of frame rate controllers that generate a motion interpolated intermediate image. The frame rate controllers exchange image information with adjacent frame rate controllers. According to the display apparatus, each frame rate controller displays the intermediate image on a corresponding display area based on the image information provided from the adjacent frame rate controller.

14 Claims, 16 Drawing Sheets

DISPLAY APPARATUS WITH FRAME RATE CONTROLLERS GENERATING MOTION INTERPOLATED INTERMEDIATE IMAGE BASED ON IMAGE INFORMATION FROM ADJACENT FRAME RATE CONTROLLER

CROSS-REFERENCE TO RELATED APPLICATION

This application claims priority from and the benefit of Korean Patent Application No. 10-2008-0060399, filed on Jun. 25, 2008, which is hereby incorporated by reference for all purposes as if fully set forth herein.

BACKGROUND OF INVENTION

1. Field of the Invention

The present invention relates to a display apparatus having high resolution.

2. Discussion of the Background

With the development of technology, the resolution of a liquid crystal display (LCD) has been gradually improved. Recently, a full high definition (FHD) LCD having a high resolution of 1920×1080 has been developed. However, since the LCD may have a hold type structure, motion blurring, in which an object is blurred when a dynamic image is displayed, may occur.

In order to prevent motion blurring, motion interpolation technology, which generates a new image frame having interpolated motion, and frame rate control technology, which adjusts the number of frames per second by inserting a new image frame between two sequentially input image frames, have been developed.

However, a high resolution LCD employing motion interpolation technology has not yet been developed. Therefore, the display quality of a high resolution LCD may be degraded due to motion blurring.

SUMMARY OF INVENTION

The present invention provides a display apparatus that may be capable of driving a display panel having high resolution without requiring additional memory.

Additional features of the invention will be set forth in the description which follows, and in part will be apparent from the description, or may be learned by practice of the invention.

The present invention discloses a display apparatus including an interface unit, n frame rate controllers, and a display panel including n display areas. The variable n represents a natural number equal to or larger than 2. The interface unit outputs n image data groups having a first image data group corresponding to a first display area, and a second image data group corresponding to a second display area adjacent to the first display area. The n frame rate controllers include a first frame rate controller and a second frame rate controller. The first frame rate controller generates a first motion-compensated intermediate image in response to the first image data group. The second frame rate controller generates a second motion-compensated intermediate image in response to the second image data group. The first display area displays the first intermediate image corresponding to the first compensation data group. The second display area displays the second intermediate image corresponding to the second compensation data group.

The present invention discloses a display apparatus including an interface unit, n frame rate controllers, and a display panel. The interface unit outputs total image data supplied from an exterior. The n frame rate controllers include a first frame rate controller and a second frame rate controller. The first frame rate controller motion-compensates a first image data group corresponding to a first display area in response to the total image data and generates at least one first compensation data group. The second frame rate controller motion-compensates a second image data group corresponding to a second display area in response to the total image data and generates at least one second compensation data group. The display panel includes n display areas having a first display area and a second display area. The first display area displays a first intermediate image corresponding to the first compensation data group, and the second display area displays a second intermediate image corresponding to the second compensation data group.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
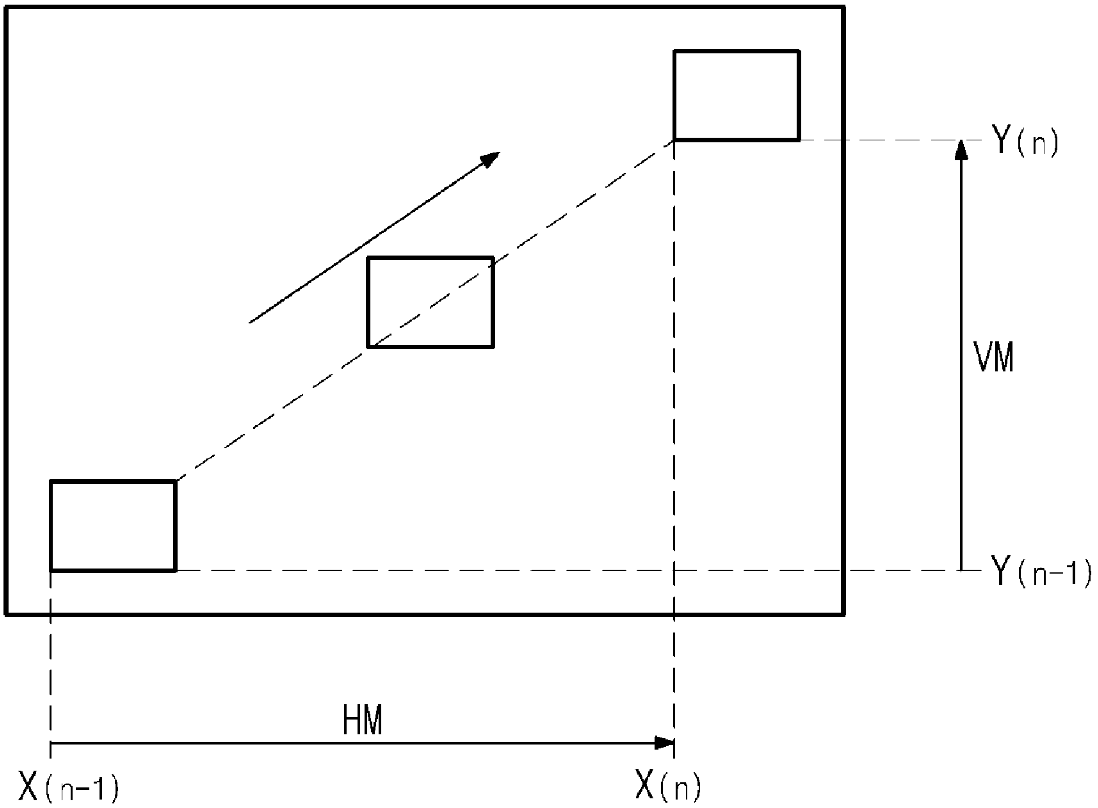
FIG. 1 is a view showing motion interpolation technology employed in a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Hereinafter, exemplary embodiments of the present invention will be explained in more detail with reference to the accompanying drawings.

A liquid crystal display (LCD) according to exemplary embodiments of the present invention includes an ultra definition (UD) LCD panel having a resolution higher than that of an FHD LCD. For example, the UD LCD may have a resolution of 3840×2160 or 4096×2160.

Further, the UD LCD panel may display an image using motion interpolation technology and frame rate control technology.

The basic principles of motion interpolation technology and frame rate control technology employed in the LCD according to exemplary embodiments of the present invention will be explained below with reference to the accompanying drawings.

FIG. 1 is a view showing the motion interpolation technology employed in the LCD according to an exemplary embodiment of the present invention.

Referring to FIG. 1, an object is shifted from a left lower end to a right upper end of a display screen. X(n−1) represents an X-axis coordinate value of a previous frame and X(n) represents an X-axis coordinate value of a present frame. Further, Y(n−1) represents a Y-axis coordinate value of the previous frame and Y(n) represents a Y axis coordinate value of the present frame.

A horizontal motion vector HM is obtained from the difference between X(n) and X(n−1). A vertical motion vector VM is obtained from the difference between Y(n) and Y(n−1). The horizontal motion vector HM includes direction and speed information about the shifting of the image along the X axis, and the vertical motion vector VM includes direction and speed information about the shifting of the image along the Y axis.

If horizontal and vertical motion vectors HM and VM are obtained, motion estimation may be performed relative to the object based on the horizontal and vertical motion vectors HM and VM. A movement route of the image on the display screen may be estimated through the motion estimation, so that a new intermediate image, in which the object is positioned on the estimated movement route, may be generated.

Figure 2:
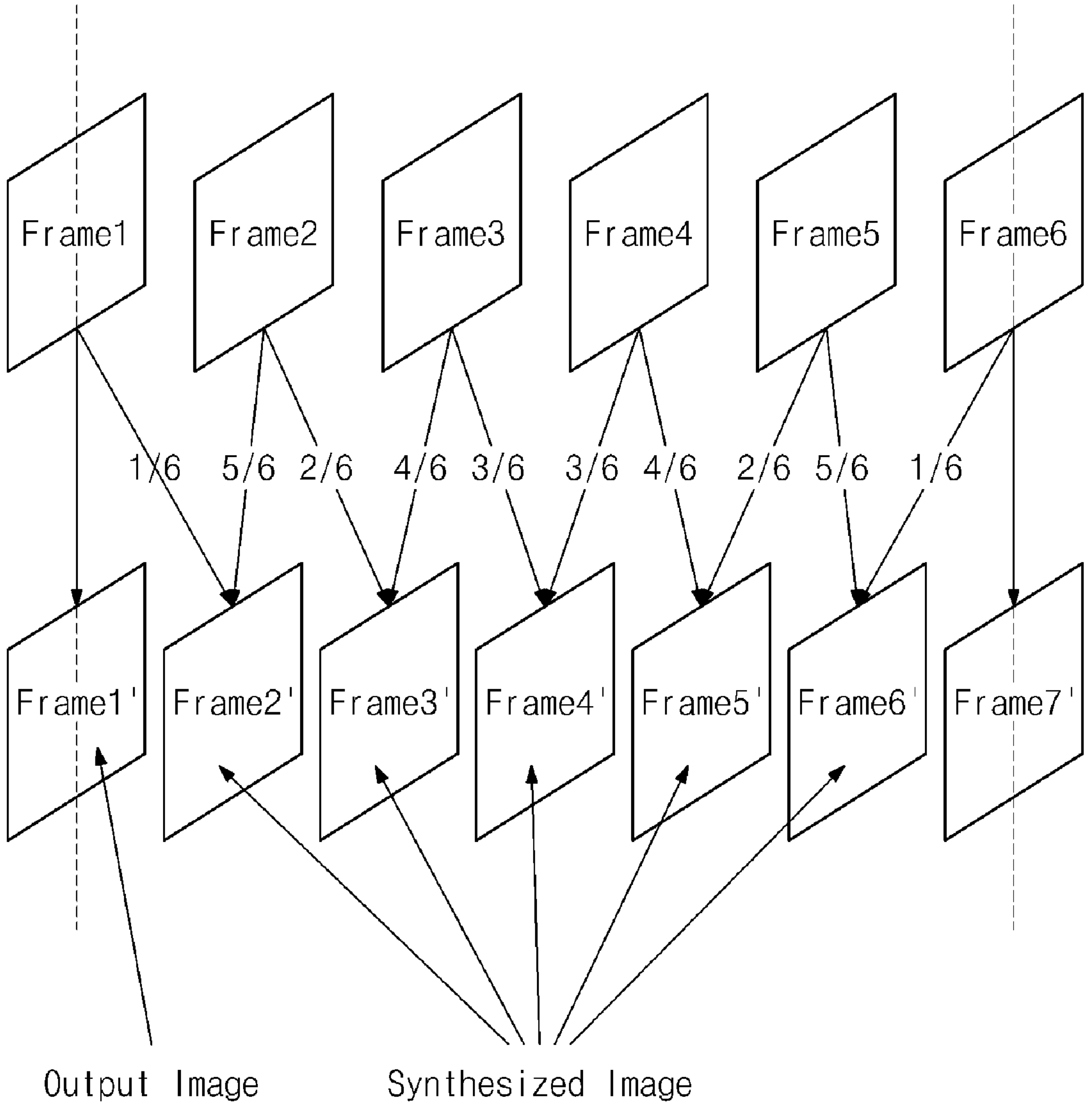
FIG. 2 is a view showing a frame rate control technology according to an exemplary embodiment of the present invention.

FIG. 2 is a view showing the frame rate control technology according to an exemplary embodiment of the present invention.

Referring to FIG. 2, the frame rate control technology varies a frame rate of input image frames transmitted per second. The frame rate denotes the number of frames allocated per second.

In FIG. 2, first to sixth input image frames Frame1 to Frame6 denote frames of an input image input to a frame rate converter, and first to seventh output image frames Frame1' to Frame7' denote frames of an output image output from the frame rate converter. The output image may have a frame frequency of 120 Hz.

As shown in FIG. 2, when six frames including the first to sixth input image frames Frame1 to Frame6 are changed into seven frames including the first to seventh output image frames Frame1' to Frame7' by varying a frame rate, the first output image frame Frame1' is identical to the first input image frame Frame1, the second to sixth motion-interpolated output image frames Frame2' to Frame6' are generated from the first to fifth input image frames Frame1 to Frame5, and the seventh motion-interpolated output image frame Frame7' is identical to sixth input image frame Frame6.

For example, the second motion-interpolated output image frame Frame2' is generated based on motion vectors obtained from the first and second input image frames Frame1 and Frame2. On the assumption that the first input image frame Frame1 is positioned at 0 and the second input image frame Frame2 is positioned at 1, the second output image frame Frame2' is obtained by synthesizing an image that is expected when the first input image frame Frame1 is shifted toward the second input image frame Frame2 by 1/6, and an image that is expected when the second input image frame Frame2 is shifted toward the input image frame Frame1 by 5/6.

The third output image frame Frame3' is obtained by synthesizing an image that is estimated when the second input image frame Frame2 is shifted toward the third input image frame Frame3 by 2/6, and an image that is estimated when the third input image frame Frame3 is shifted toward the second input image frame Frame2 by 4/6. In the same manner, the fourth to sixth output image frames Frame4' to Frame6' are obtained, respectively.

Hereinafter, an ultra high resolution LCD employing motion interpolation technology and frame rate control technology according to an exemplary embodiment of the present invention will be explained in detail with reference to the accompanying drawings.

Figure 3:
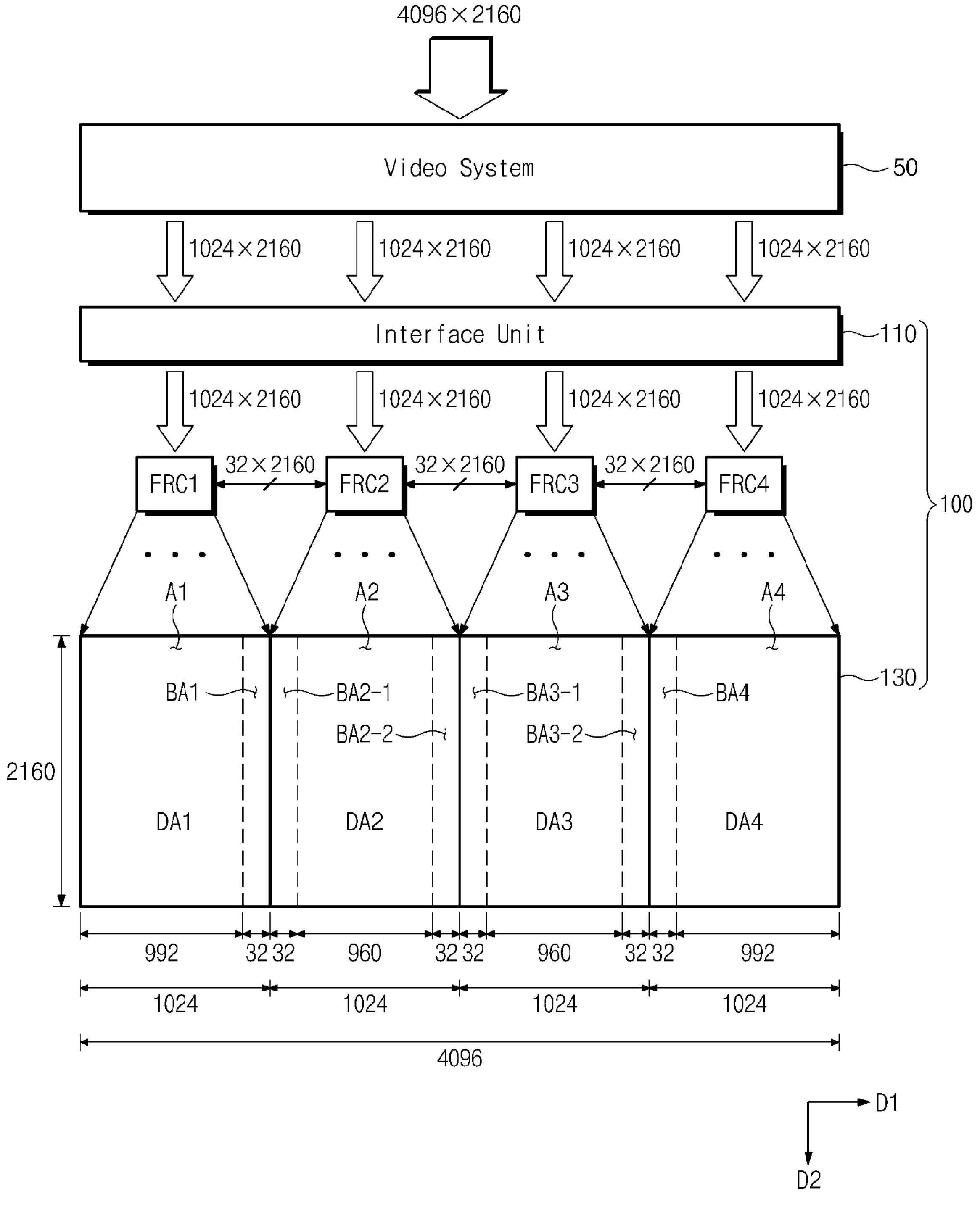
FIG. 3 is a block diagram showing a liquid crystal display according to an exemplary embodiment of the present invention.

FIG. 3 is a block diagram showing an LCD according to an exemplary embodiment of the present invention.

Referring to FIG. 3, the LCD 100 includes an interface unit 110 to receive image data from a video system 50 provided outside the LCD 100, n frame rate controllers, and a display unit 130.

The present exemplary embodiment will be described assuming that the display unit 130 includes an LCD panel having a resolution of (n×i)×j. For example, n may denote a natural number equal to or larger than 2, i may denote 1024 and j may denote 2160. FIG. 3 shows an example in which n is 4. Thus, in the present exemplary embodiment, the display unit 130 may include an LCD panel having an ultra high resolution of 4096×2160, which is higher than that of an FHD LCD panel.

The video system 50 receives (4096×2160) image data to display an image on the display unit 130. Then, the video system 50 divides the received (4096×2160) image data into n image data groups. The n image data groups are transmitted in parallel to the interface unit 110. In the present exemplary embodiment, since n is 4, each image data group has (1024×2160) image data. The four image data groups are transmitted in parallel to the interface unit 110.

The interface unit 110 receives the four image data groups in parallel using a low voltage differential signaling (LVDS) transmission scheme. Then, the interface unit 110 transmits the image data groups to the n frame rate controllers, respectively.

The n frame rate controllers include first to fourth frame rate controllers FRC1 to FRC4. Each of the first to fourth frame rate controllers FRC1 to FRC4 obtains four compensation data groups using four image data groups corresponding to an $N^{th}$ frame and four image data groups corresponding to an $(N+1)^{th}$ frame.

Further, the first to fourth frame rate controllers FRC1 to FRC4 generate four motion-interpolated intermediate image frames using the four compensation data groups. Each of the four intermediate image frames is allocated between the $N^{th}$ frame and the $(N+1)^{th}$ frame by a corresponding frame rate controller.

The four intermediate image frames are applied to first to fourth display areas DA1 to DA4 of the display unit 130, respectively. Thus, the first to fourth display areas DA1 to DA4 display four intermediate images corresponding to the four intermediate image frames, respectively.

Meanwhile, each of the first to fourth frame rate controllers FRC1 to FRC4 exchanges image information with an adjacent frame rate controller. A detailed description thereof will be given below.

The LCD panel having resolution of 4096×2160, which is provided in the display unit 130, includes n divided display areas.

In detail, in the LCD panel having resolution of 4096×2160, 4096 pixels are arranged in the first direction D1 and 2160 pixels are arranged in the second direction D2.

The LCD panel includes the first to fourth display areas DA1 to DA4 divided in the second direction D2. In each of the first to fourth display areas DA1 to DA4, 1024 pixels may be arranged in the first direction D1 and 2160 pixels may be arranged in the second direction D2. Thus, each of the first to fourth display areas DA1 to DA4 may have a resolution of 1024×2160.

In more detail, the first display area DA1 includes a first area A1 and a first boundary area BA1 adjacent to the first area A1. For example, in the first area A1, 992 pixels may be arranged in the first direction D1 and 2160 pixels may be arranged in the second direction D2. In the first boundary area BA1, 32 pixels may be arranged in the first direction D1 and 2160 pixels may be arranged in the second direction D2. Thus, the first area A1 may have a resolution of 992×2160 and the first boundary area BA1 may have a resolution of 32×2160.

The second display area DA2 includes a second left boundary area BA2-1 adjacent to the first boundary area BA1, a second area A2 adjacent to the second left boundary area BA2-1, and a second right boundary area BA2-2 adjacent to the second area A2. For example, in each of the second left boundary area BA2-1 and the second right boundary area BA2-2, 32 pixels may be arranged in the first direction D1 and 2160 pixels may be arranged in the second direction D2. In the second area A2 between the second left boundary area BA2-1 and the second right boundary area BA2-2, 960 pixels may be arranged in the first direction D1 and 2160 pixels may be arranged in the second direction D2. Thus, each of the second left boundary area BA2-1 and the second right boundary area BA2-2 may have a resolution of 32×2160 and the second area A2 may have a resolution of 960×2160.

The third display area DA3 includes a third left boundary area BA3-1 adjacent to the second right boundary area BA2-2, a third area A3 adjacent to the third left boundary area BA3-1, and a third right boundary area BA3-2 adjacent to the third area A3. For example, the areas BA3-1, A3, and BA3-2 constituting the third display area DA3 may have the same resolutions as those of the areas BA2-1, A2, and BA2-2 constituting the second display area DA2, respectively.

The fourth display area DA4 includes a fourth boundary area BA4 adjacent to the third right boundary area BA3-2, and a fourth area A4 adjacent to the fourth boundary area BA4. For example, the fourth boundary area BA4 may have the same resolution as that of the first boundary area BA1 provided in the first display area DA1, and the fourth area A4 may have the same resolution as that of the first area A1 provided in the first display area DA1.

Figure 4:
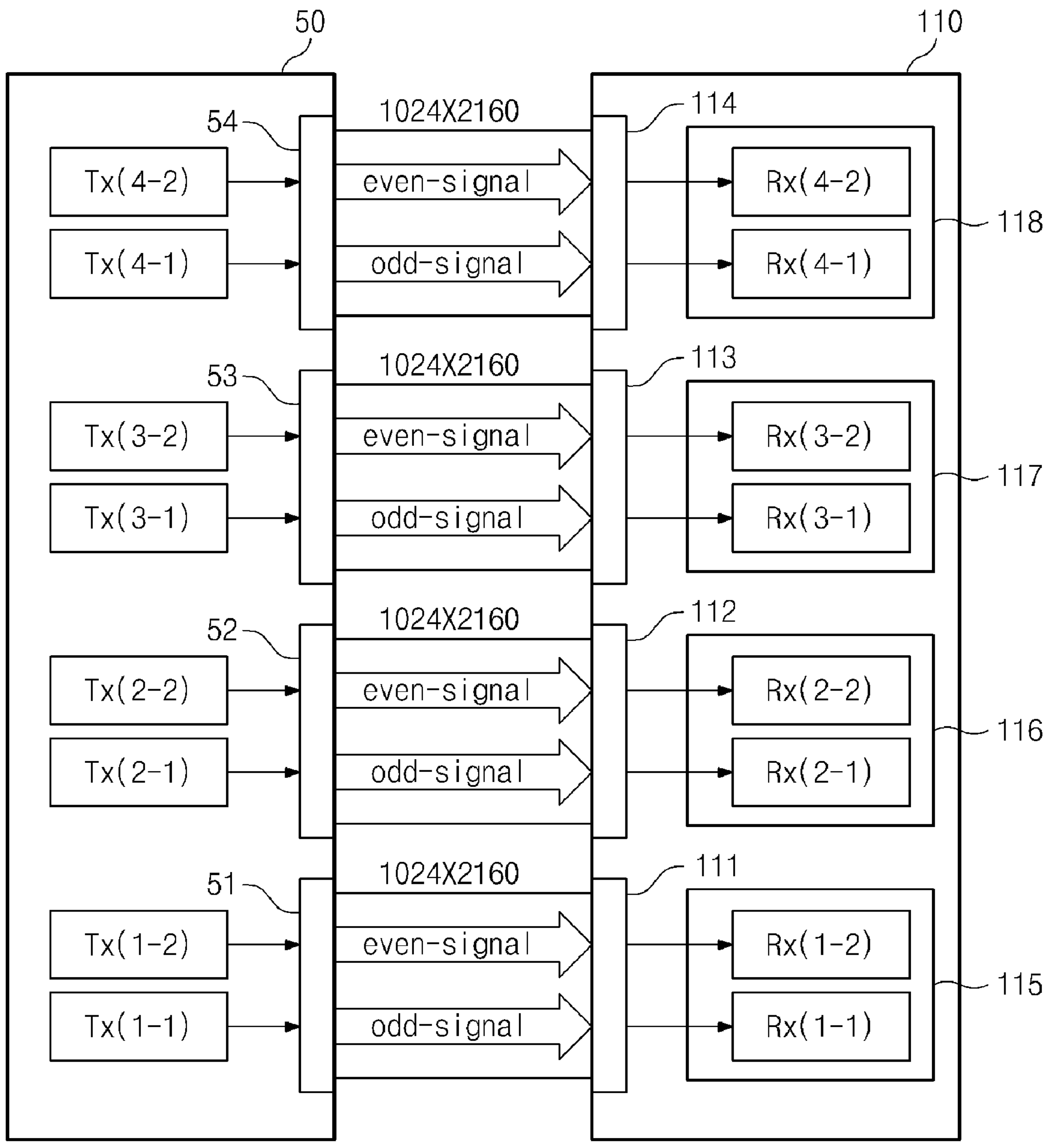
FIG. 4 is a block diagram showing a connection relation between the video system and the interface unit shown in FIG. 3.

FIG. 4 is a block diagram showing a connection relation between the video system and the interface unit shown in FIG. 3.

Referring to FIG. 4, the interface unit 110 includes first to fourth receiving connectors 111 to 114 and first to fourth receiving circuits 115 to 118. Each of the first to fourth receiving circuits 115 to 118 include two data receivers, which receive image data groups having 1024×2160 pixel data, respectively. In detail, the interface unit 110 includes a total of eight data receivers Rx(1-1), Rx(1-2), Rx(2-1), Rx(2-2), Rx(3-1), Rx(3-2), Rx(4-1), and Rx(4-2).

Meanwhile, the video system 50 interfacing with the interface unit 110 includes first to fourth transmitting connectors 51 to 54 connected with the first to fourth receiving connectors 111 to 114, respectively.

The first to fourth transmitting connectors 51 to 54 each receive image data groups having (1024×2160) image data from two data transmitters, respectively. In detail, the video system 50 includes a total of eight data transmitters Tx(1-1), Tx(1-2), Tx(2-1), Tx(2-2), Tx(3-1), Tx(3-2), Tx(4-1), and Tx(4-2).

As shown in FIG. 4, each of the first to fourth receiving connectors 111 to 114 receive the image data groups having (1024×2160) image data through two channels, respectively.

In detail, each of the first to fourth receiving connectors 111 to 114 receives pixel data in odd sequences of the (1024×2160) image data through the first channel, and pixel data in even sequences of the (1024×2160) image data through the second channel. Although not shown in FIG. 4, the pixel data in the odd sequences is allocated to data lines that are provided in the LCD panel in odd sequences, and the pixel data in the even sequences is allocated to data lines that are provided in the LCD panel in even sequences.

According to the present exemplary embodiment as described above, each of the first to fourth frame rate controllers FRC1 to FRC4 shown in FIG. 3 may exchange image information with an adjacent frame rate controller so that an LCD employing motion interpolation technology and frame rate control technology may solve the following problems.

Figure 5:
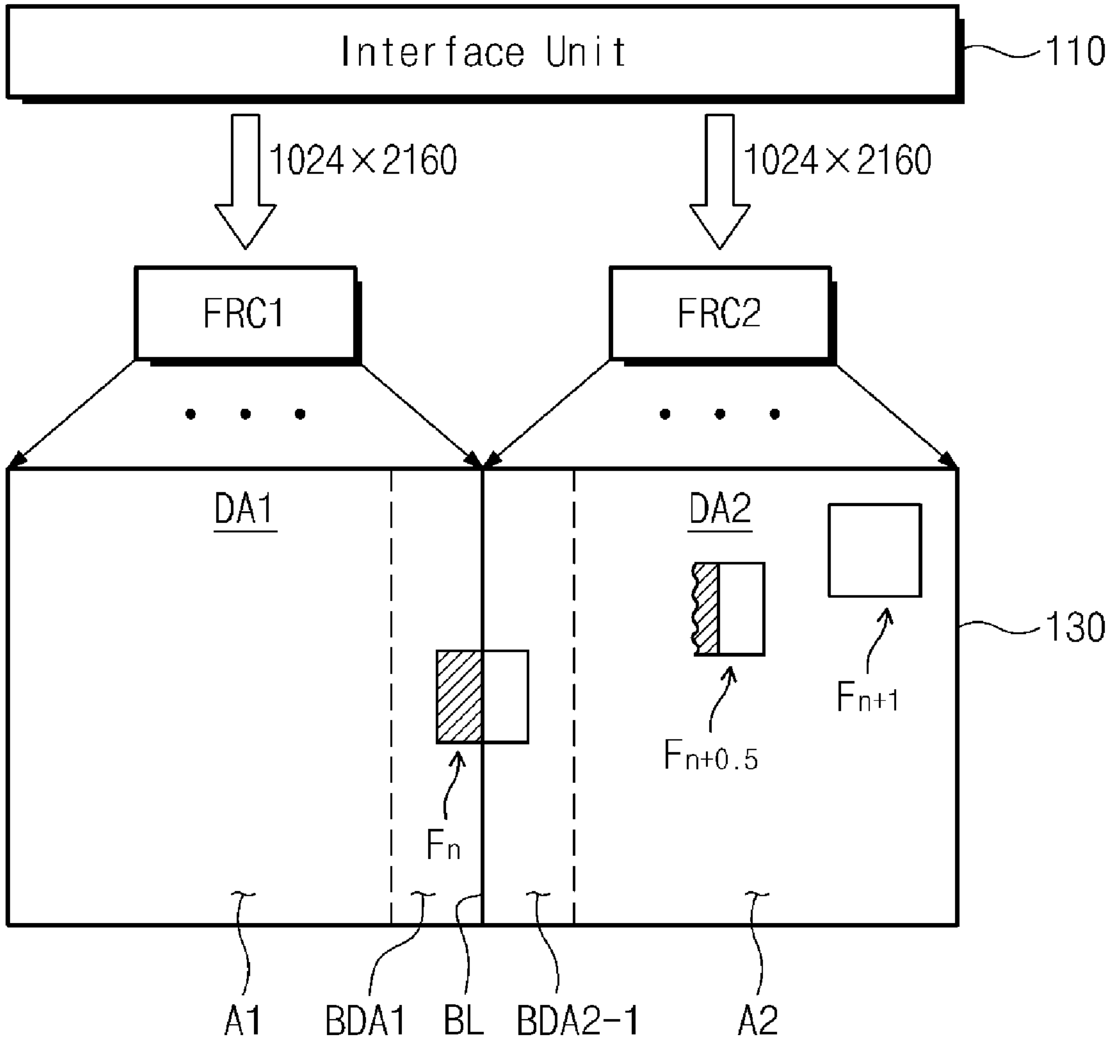
FIG. 5 and FIG. 6 are block diagrams showing problems occurring when motion interpolation technology and frame rate control technology are applied to a liquid crystal display having ultra high resolution according to an exemplary embodiment of the present invention.
Figure 6:
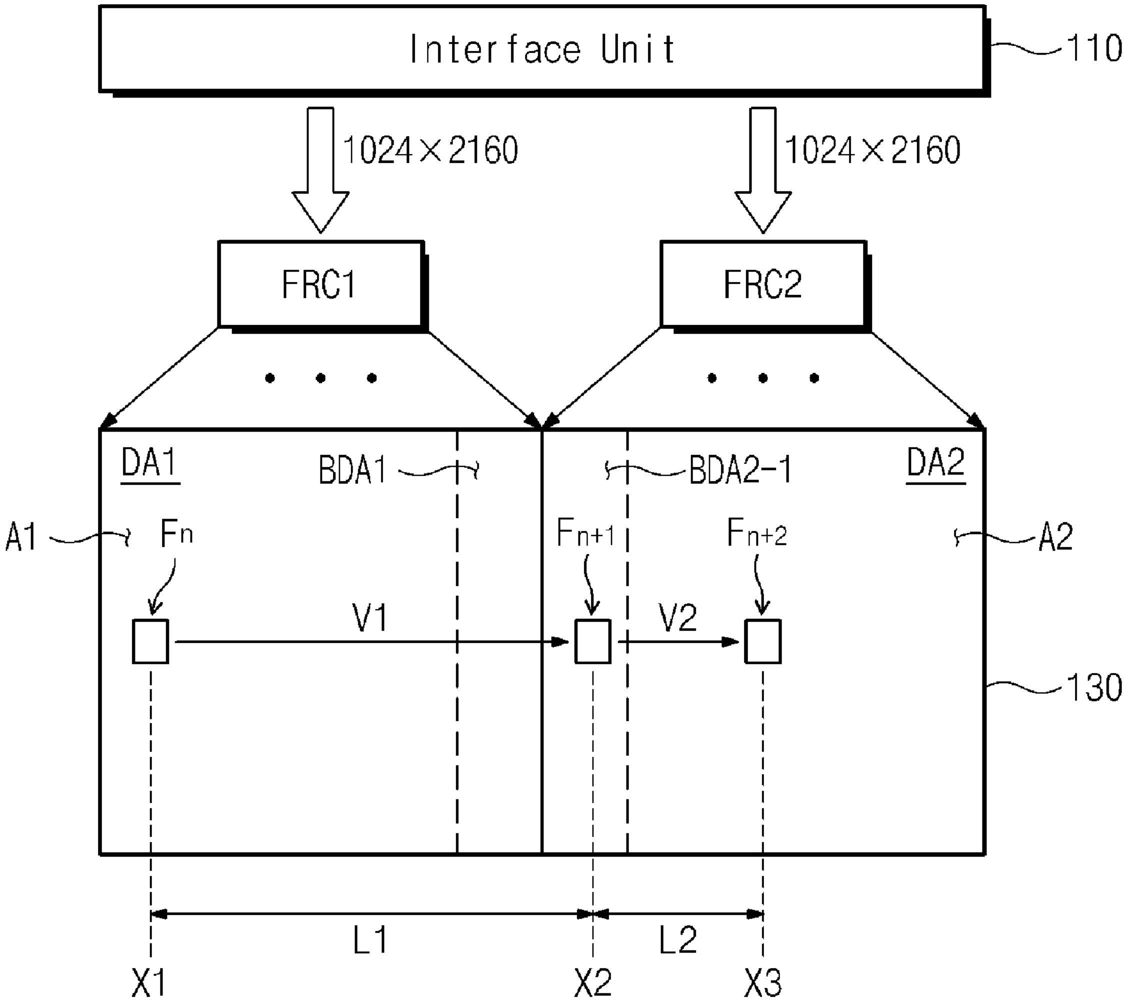

FIG. 5 and FIG. 6 are block diagrams showing problems that may occur when motion interpolation technology and frame rate control technology are applied to an LCD having ultra high resolution according to an exemplary embodiment of the present invention. For the convenience of description, FIG. 5 and FIG. 6 show only the first and second frame rate controllers FRC1 and FRC2 and the first and second display areas DA1 and DA2 of the display unit.

FIG. 5 shows a case in which the display unit 130 sequentially displays the input image frame $F_n$, in which a rectangular object is positioned on a boundary line BL between the first and second display areas DA1 and DA2, in the $n^{th}$ frame, and the input image frame $F_{(n+1)}$, in which the object is positioned at a right upper end portion of the second display area DA2, in the $(n+1)^{th}$ frame. The second frame rate controller FRC2 shown in FIG. 5 obtained a motion vector from the input image to generate an intermediate image frame $F_{(n+0.5)}$ positioned on the movement route of the object based on the motion vector.

In such a case, as shown in FIG. 5, the second frame rate controller FRC2 generates an intermediate image frame $F_{(n+0.5)}$ in which the object may not be exactly restored to have a rectangular shape. This is because the second frame rate controller FRC2 has no image information (information on the shape and size of the part marked by oblique lines) on the left shape of the object cut by the boundary line BL. In detail, the second frame rate controller FRC2 receives no image information on the object displayed in a first boundary area BDA1 of the first display area DA1 from the interface unit 110.

Thus, the second frame rate controller FRC2 generates the intermediate image frame $F_{(n+0.5)}$ based on incomplete image information of the left shape of the object displayed in the second left peripheral area BDA2-1 of the second display area DA2, and image information of the shape of the object displayed in the right upper end of the second area A2 of the second display area DA2. Consequently, the second frame rate controller FRC2 generates the intermediate image frame $F_{(n+0.5)}$, in which the object is not restored to the original shape.

Hereinafter, a case in which, the shape of the object is exactly restored but the image of the object having a speed varying depending on time is not exactly displayed, will be described.

Referring to FIG. 6, the object is shifted from the first display area DA1 to the second display area DA2 and the movement speed of the object is gradually reduced. In detail, the object is positioned at a first point X1 in the first display area DA1 in the $n^{th}$ frame $F_n$, positioned at a second point X2 in the second left peripheral area BDA2-1 of the second display area DA2 in the $(n+1)^{th}$ frame $F_{n+1}$, and positioned at a third point X3 in the second area A2 of the second display area DA2 in the $(n+2)^{th}$ frame $F_{n+2}$. At this time, a distance L1 between the first point X1 and the second point X2 is greater than a distance L2 between the second point X2 and the third point X3. Since a time interval of each frame is the same, the display unit 130 displays the image of the object having a gradually increased movement speed v1.

When an intermediate image between the $(n+1)^{th}$ frame $F_{n+1}$ and the $(n+2)^{th}$ frame $F_{n+2}$ is generated, the second frame rate controller FRC2 generates the intermediate image inserted into an $(n+1.5)^{th}$ frame based on the $(n+1)^{th}$ image and the $(n+2)^{th}$ image. At this time, since the movement speed v1 of the object is gradually reduced, the object should be positioned adjacent to the third point X3 in the $(n+1.5)^{th}$ frame.

However, the second frame rate controller FRC2 receives no image information on the movement speed v1 of the object, which is shifted from the first point X1 to the second point X2, from the interface unit 110. Thus, the second frame rate controller FRC2 simply generates the $(n+1.5)^{th}$ image based on position information of the second and third points X2 and X3. As a result, the second frame rate controller FRC2 generates an intermediate image of the object positioned at an intermediate point between the second and third points X2 and X3 instead of at the point adjacent to the third point X3.

In order to solve the problems described with reference to FIG. 5 and FIG. 6, the exemplary embodiment of the present invention proposes a structure in which frame rate controllers adjacent to each other exchange image information on a corresponding boundary area with each other.

Figure 7:
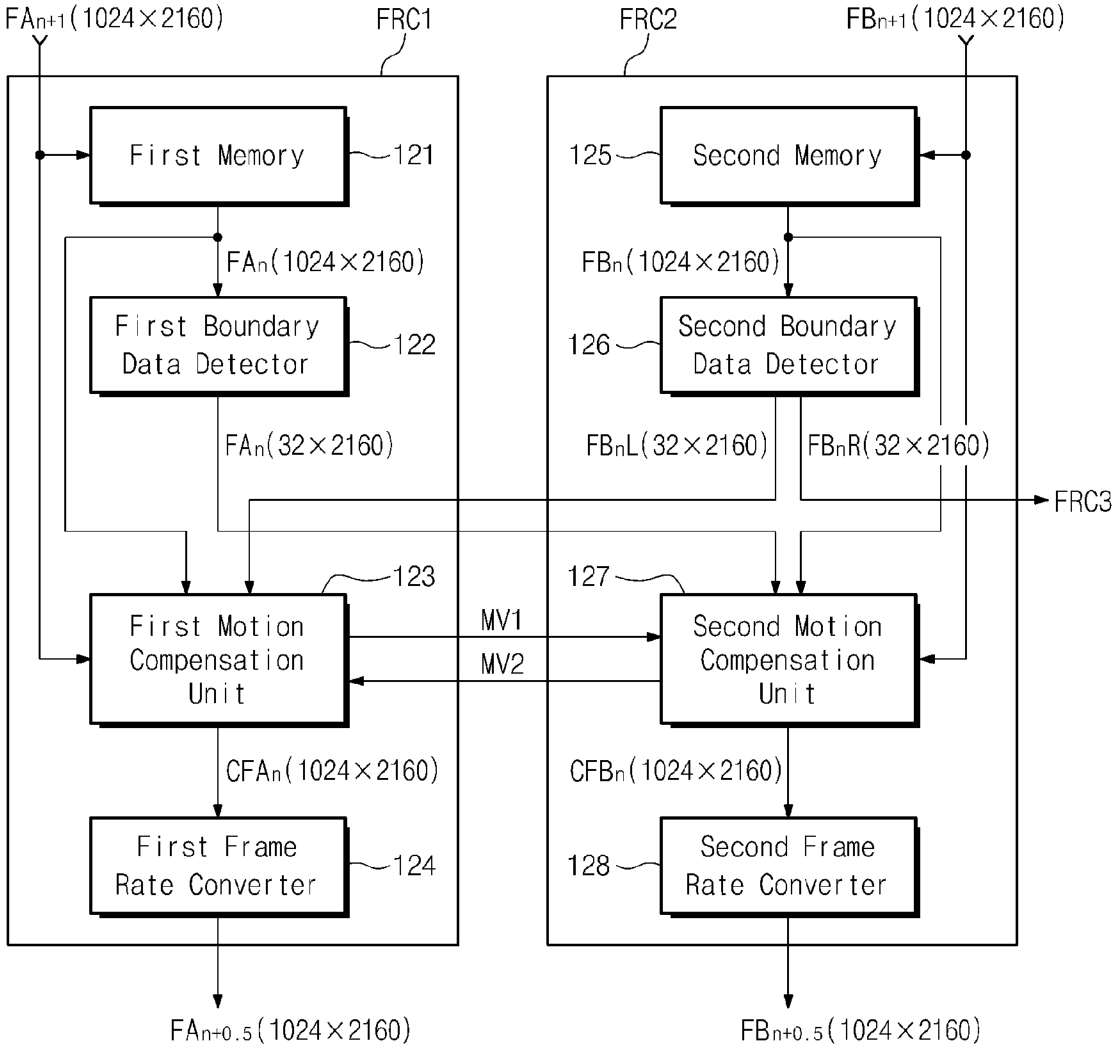
FIG. 7 is a block diagram showing an internal configuration of the frame rate controller shown in FIG. 3 and a connection relation between adjacent frame rate controllers.

FIG. 7 is a block diagram showing an internal configuration of the frame rate controller shown in FIG. 3 and a connection relation between the adjacent frame rate controllers. FIG. 7 shows a connection relation between the first and second frame rate controllers. A description about a connection relation between the second and third frame rate controllers and a connection relation between the third and fourth frame rate controllers is not included here because they are similar to the connection relation between the first and second frame rate controllers.

Referring to FIG. 7, the first frame rate controller FRC1 includes a first memory 121, a first boundary data detector 122, a first motion compensation unit 123, and a first frame rate converter 124.

The first memory 121 receives a first image data group corresponding to the first display area DA1 from the first receiving circuit 115 (see FIG. 4) by the frame. The first image data group may include (1024×2160) pixel data. If the first image data group ($FA_{(n+1)}$(1024×2160)) of the $(n+1)^{th}$ frame is input to the first memory 121, the first image data group ($FA_n$(1024×2160)) of the $n^{th}$ frame stored in the first memory 121 is output to the first boundary data detector 122 and the first motion compensation unit 123.

The first boundary data detector 122 detects a first boundary data group ($FA_n$(32×2160)) from the first image data group ($FA_n$(1024×2160)) of the $n^{th}$ frame received from the first memory 121. The first boundary data group ($FA_n$(32×2160)) corresponds to the first boundary area BA1 (see FIG. 3) of the first display area DA1 (see FIG. 3). The first boundary data group ($FA_n$(32×2160)) includes (32×2160) pixel data. Then, the first boundary data group ($FA_n$(32×2160)) is transmitted to the second motion compensation unit 127 of the second frame rate controller FRC2. For example, the first boundary data group ($FA_n$(32×2160)) may be transmitted to the second frame rate controller FRC2 through a serial transmission scheme such as a transistor-to-transistor level (TTL) transmission scheme or an I2C transmission scheme.

The first motion compensation unit 123 receives the first image data group ($FA_{(n+1)}$(1024×2160)) of the $(n+1)^{th}$ frame and receives the first image data group ($FA_n$(1024×2160)) of the $n^{th}$ frame from the first memory 121. Further, the first motion compensation unit 123 receives a second left boundary data group ($FB_nL$(32×2160)) and a second motion vector MV2 from the second frame rate controller FRC2. The first motion compensation unit 123 obtains a first motion vector MV1 based on the first image data group ($FA_n$(1024×2160)) of the $n^{th}$ frame, the first image data group ($FA_{(n+1)}$(1024×2160)) of the $(n+1)^{th}$ frame, the second left boundary data group ($FB_nL$(32×2160)), and the second motion vector MV2. Further, the first motion compensation unit 123 generates a compensation data group ($CFA_n$(1024×2160)), for which motion compensation has been performed, based on the first motion vector MV1. Then, the compensation data group ($CFA_n$(1024×2160)) is transmitted to the first frame rate converter 124.

The first frame rate converter 124 generates an intermediate image data group ($FA_{(n+0.5)}$(1024×2160)) based on the compensation data group ($CFA_n$(1024×2160)). The first frame rate converter 124 varies a frame rate of an image frame transmitted from the video system 50 (see FIG. 3) by allocating the intermediate image data group ($FA_{(n+0.5)}$(1024×2160)) between the $n^{th}$ frame and the $(n+1)^{th}$ frame.

As described above, the first frame rate controller FRC1 receives image information of the movement object displayed on the second left boundary area BA2-1 of the second display area DA2 from the second frame rate controller FRC2.

Thus, the present exemplary embodiment of the present invention can prevent an operation error occurring in the process of obtaining the first motion vector MV1 of the object shifted from the second left boundary area BA2-1 of the second display area DA2 to the first display area DA1.

The second frame rate controller FRC2, which transmits/receives data to/from the first frame rate controller FRC1, includes a second memory 125, a second boundary data detector 126, a second motion compensation unit 127, and a second frame rate converter 128.

The second memory 125 receives a second image data group corresponding to the second display area DA2 from the second receiving circuit 116 (see FIG. 4) by the frame. The second image data group may include (1024×2160) pixel data. If the second image data group ($FB_{(n+1)}$(1024×2160)) of the (n+1)$^{th}$ frame is input to the second memory 125, the second image data group ($FB_n$(1024×2160)) of the n$^{th}$ frame stored in the second memory 125 is output to the second boundary data detector 126 and the second motion compensation unit 127.

The second boundary data detector 126 detects the second left boundary data group ($FB_n$L(32×2160)) and second right boundary data group ($FB_n$R(32×2160)) from the second image data group ($FB_n$(1024×2160)). The second left boundary data group ($FB_n$L(32×2160)) corresponds to the second left boundary area BA2-1 (see FIG. 3) of the second display area DA2 (see FIG. 3), and the second right boundary data group ($FB_n$R(32×2160)) corresponds to the second right boundary area BA2-2 (see FIG. 3) of the second display area DA2. Then, the second left boundary data group ($FB_n$L(32×2160)) is input to the first motion compensation unit 123 of the first frame rate controller FRC1, and the second right boundary data group ($FB_n$R(32×2160)) is input to the third motion compensation unit (not shown) of the third frame rate controller FRC3 (see FIG. 3).

The second motion compensation unit 127 receives the second image data group ($FB_n$(1024×2160)) of the n$^{th}$ frame and the second image data group ($FB_{(n+1)}$(1024×2160)) of the (n+1)$^{th}$ frame. Further, the second motion compensation unit 127 receives the first boundary data group ($FA_n$(32×2160)) from the first boundary data detector 122 of the first frame rate controller FRC1, and the first motion vector MV1 from the first motion compensation unit 123 of the first frame rate controller FRC1.

The second motion compensation unit 127 obtains the second motion vector MV2 based on the second image data group ($FB_n$(1024×2160)) of the n$^{th}$ frame, the second image data group ($FB_{(n+1)}$(1024×2160)) of the (n+1)$^{th}$ frame, the first boundary data group ($FA_n$(32×2160)), and the first motion vector MV1. Then, the second motion compensation unit 127 generates a compensation data group ($CFB_n$(1024×2160)), for which motion compensation has been performed, based on the second motion vector MV2. Then, the compensation data group ($CFB_n$(1024×2160)) is transmitted to the second frame rate converter 128.

The second frame rate converter 128 generates an intermediate image data group ($FB_{(n+0.5)}$(1024×2160)) based on the compensation data group ($CFB_n$(1024×2160)). The second frame rate converter 128 varies a frame rate of an image frame transmitted from the video system 50 (see FIG. 3) by allocating the intermediate image data group ($FB_{(n+0.5)}$(1024×2160)) between the n$^{th}$ frame and the (n+1)$^{th}$ frame.

As described above, the second frame rate controller FRC2 receives image information of the movement object displayed on the first boundary area BA1 of the first display area DA1 from the first frame rate controller FRC1. Thus, the present exemplary embodiment of the present invention may prevent the occurrence of an operation error in the process of obtaining the second motion vector MV2 of the object shifted from the first boundary area BA1 of the first display area DA1 to the second display area DA2.

Figure 8:
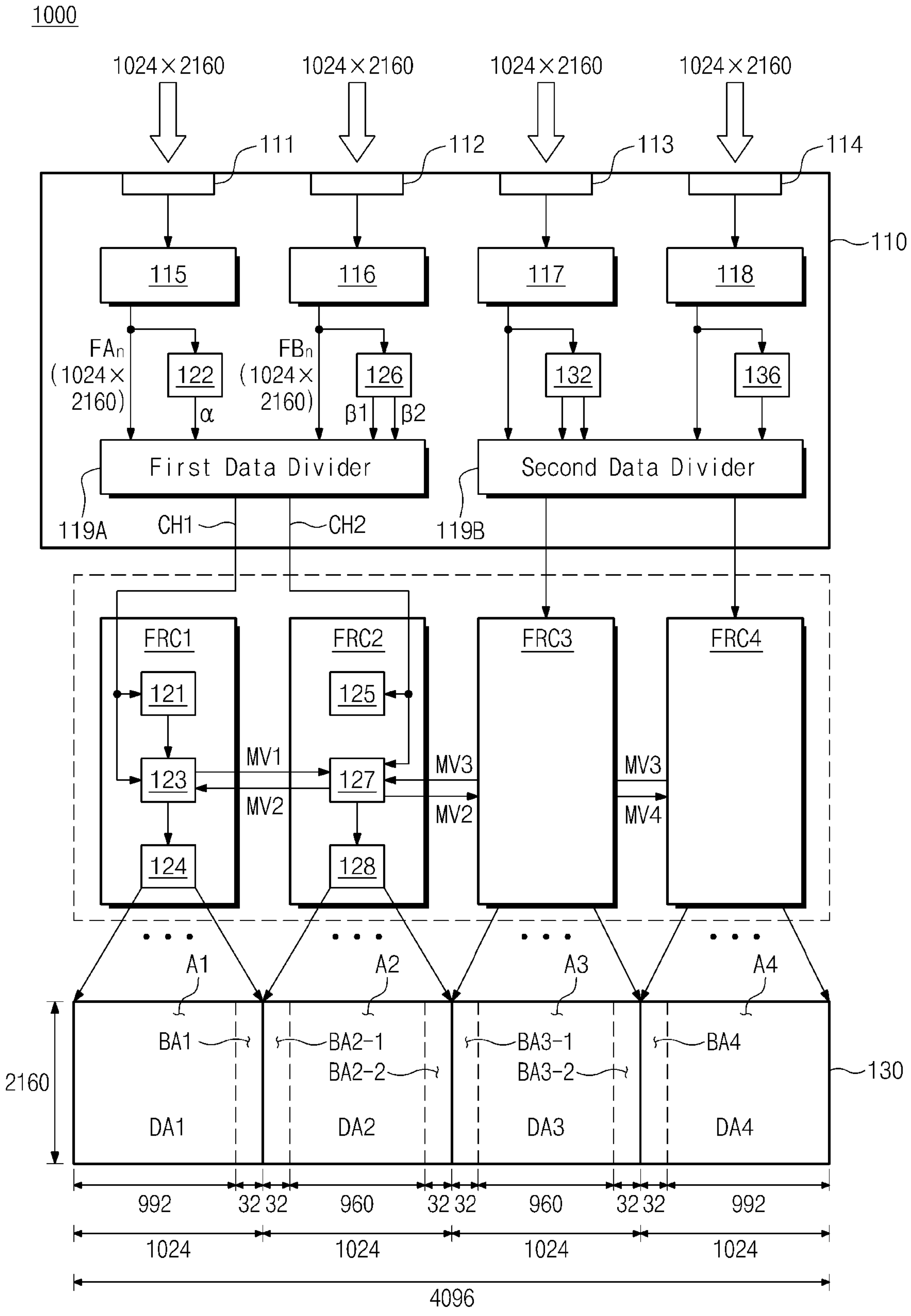
FIG. 8 is a block diagram showing a liquid crystal display according to another exemplary embodiment of the present invention.

FIG. 8 is a block diagram showing an LCD according to another exemplary embodiment of the present invention.

Referring to FIG. 8, in the LCD 1000, the boundary data detectors 122 and 126 are included in the interface unit 110 instead of in the first and second frame rate controllers FRC1 and FRC2. Thus, in the LCD 1000, the internal circuits of the frame rate controllers may be easily designed as compared with the exemplary embodiment shown in FIG. 3. Further, in the LCD 1000, an operation process of detecting data of a boundary area is performed by the interface unit 110, so that the burden on the frame rate controller to perform the entire operation process in order to generate an intermediate image may be eliminated.

In detail, the interface unit 110 provided in the LCD 1000 includes first to fourth receiving connectors 111 to 114, first to fourth receiving circuits 115 to 118, first to fourth boundary data detectors 122, 126, 132, and 136, a first data divider 119A, and a second data divider 119B.

The first boundary data detector 122 receives a first image data group ($FA_n$(1024×2160)) (hereinafter, referred to as $FA_n$) from the first receiving circuit 115 to detect a first boundary data group a corresponding to a first boundary area BA1 from the first image data group $FA_n$. The first boundary data group a may include (32×2160) pixel data. Then, the first boundary data group a is transmitted to the first data divider 119A.

The second boundary data detector 126 receives a second image data group ($FB_n$(1024×2160)) (hereinafter, referred to as $FB_n$) from the second receiving circuit 116 to detect a second left boundary data group β1 corresponding to a second left boundary area BA2-1 and a second right boundary data group β2 corresponding to a second right boundary area BA2-2 from the second image data group $FB_n$. Then, the second left boundary data group β1 and the second right boundary data group β2 are transmitted to the first data divider 119A.

The first data divider 119A receives the first image data group $FA_n$, the first boundary data group a, the second image data group $FB_n$, and the second left and right boundary data groups β1 and β2. The first data divider 119A divides the data groups, which are received from the first and second receiving circuits 115 and 116 and the first and second boundary data detectors 122 and 126, into a first data group, which includes the first image data group $FA_n$ and the second left boundary data group β1, and a second data group, which includes the second image data group $FB_n$, the first boundary data group a, and the second right boundary data group β2. Then, the first data group is transmitted to the first frame rate controller FRC1 through a first channel CH1, and the second data group is transmitted to the second frame rate controller FRC2 through a second channel CH2.

The second data divider 119B has the same configuration and function as those of the first data divider 119A, except for the type of the data group divided by the first data divider 119A. Thus, a detailed description about the second data divider 119B will be omitted.

The first frame rate controller FRC1 to receive the first data group includes the first memory 121, the first motion compensation unit 123, and the first frame rate converter 124 as described with reference to FIG. 7. The second frame rate controller FRC2 to receive the second data group includes the second memory 125, the second motion compensation unit 127, and the second frame rate converter 128 as described with reference to FIG. 7.

As described above, an LCD according to exemplary embodiments of the present invention controls the LCD panel having ultra high resolution using motion interpolation technology and frame rate control technology, which may prevent motion blurring in which an object is blurred when a dynamic image is displayed.

Further, the frame rate controllers provided in an LCD according to exemplary embodiments of the present invention exchange image information with adjacent frame rate controllers, respectively, that may prevent a display error of an intermediate image displayed on corresponding display areas, which is caused when each frame rate controller receives no image information on a display area adjacent to the corresponding display areas.

Figure 9:
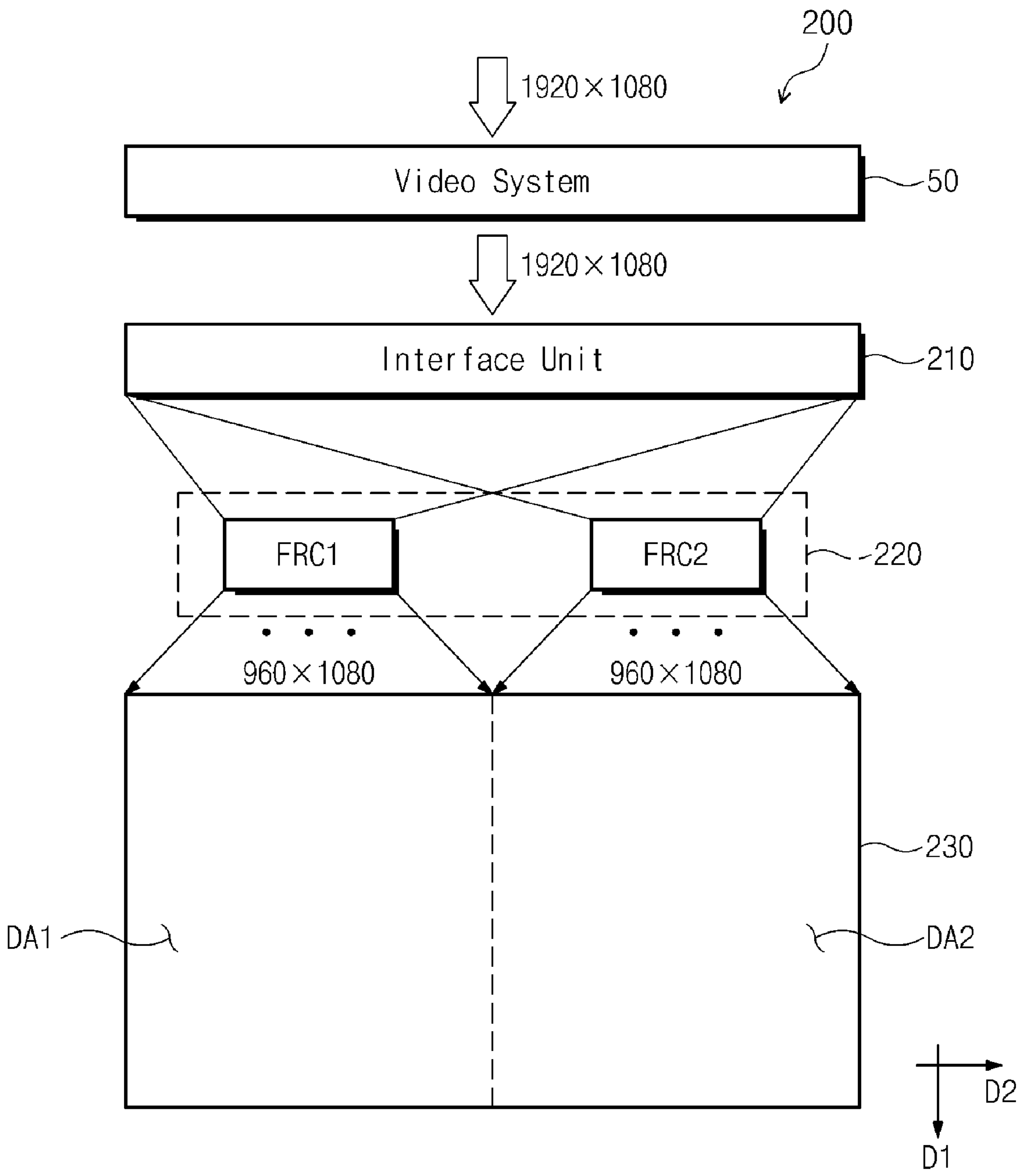
FIG. 9 is a block diagram showing another exemplary embodiment of LCD according to the present invention.

FIG. 9 is a block diagram showing another exemplary embodiment of LCD according to the present invention.

Referring to FIG. 9, an LCD 200 includes an interface unit 210, a frame rate control unit 220, and a display unit 230. The interface unit 210 receives an image data from a video system 50 disposed in exterior thereof.

The present exemplary embodiment will be described on the assumption that the display unit 230 includes an LCD panel having a resolution of (n×i)×j. For example, n may denote 2, i may denote 960 and j may denote 1080. Thus, in the present exemplary embodiment, the display unit 130 may include an LCD panel having a high resolution of 1920×1080.

The video system 50 receives (1920×1080) image data from the exterior to display an image on the display unit 230 and transmits the (1920×1080) image data to the interface unit 210.

The interface unit 210 receives the (1920×1080) image data using a low voltage differential signaling (LVDS) transmission scheme. Then, the interface unit 210 transmits the (1920×1080) image data (hereinafter, referred to as a total image data) to the frame rate control unit 220. The frame rate control unit 220 includes n frame rate controllers. In the present exemplary embodiment, since the n denotes 2, the frame rage control unit 220 includes a first frame rate controller FRC1 and a second frame rate controller FRC2. Each of the first and second frame rate controllers FRC1 and FRC2 receives the total image data (1920×1080) from the interface unit 210.

The first frame rate controller FRC1 obtains one or more first compensation data groups using the total image data (hereinafter, referred to as an $N^{th}$ frame data) corresponding to an $N^{th}$ frame and the total images data (hereinafter, referred to as an $(N+1)^{th}$ frame data) corresponding to an $(N+1)^{th}$ frame. The first compensation data group is generated by motion-interpolating a first image data group of the $N^{th}$ frame data. The first frame rate controller FRC1 also outputs the first compensation data group between the $N^{th}$ frame and the $(N+1)^{th}$ frame to generate an intermediate frame.

The second frame rate controller FRC2 obtains one or more second compensation data groups using the $N^{th}$ frame data and the $(N+1)^{th}$ frame data. The second compensation data group is generated by motion-interpolating a second image data group of the $N^{th}$ frame data. The second frame rate controller FRC2 also outputs the second compensation data group between the $N^{th}$ frame and the $(N+1)^{th}$ frame to generate an intermediate frame.

The display unit 230 is divided into n display areas. For example, the n may denote a natural number equal to or larger than 2. In the present exemplary embodiment, since the n is 2, the n display areas include a first display area DA1 and a second display area DA2. The first display area DA1 receives the first compensation data group during the intermediate frame and displays an intermediate image corresponding to the first compensate data group. The second display area DA2 receives the second compensate data group during the intermediate frame and displays an intermediated image corresponding to the second compensate data group.

The display unit 230 includes the liquid crystal display panel having a resolution of (1920×1080), 1920 pixels are arranged in the first direction D1, and 1080 pixels are arranged in the second direction D2.

The LCD panel is divided in the second direction D2, and thus includes the first and second display areas DA1 and DA2. Therefore, in each of the first and second display areas DA1 and DA2, 960 pixels may be arranged in the first direction D1 and 1080 pixels may be arranged in the second direction D2. Therefore, each of the first and second display areas DA1 and DA2 may have a resolution of 960×1080.

Figure 10:
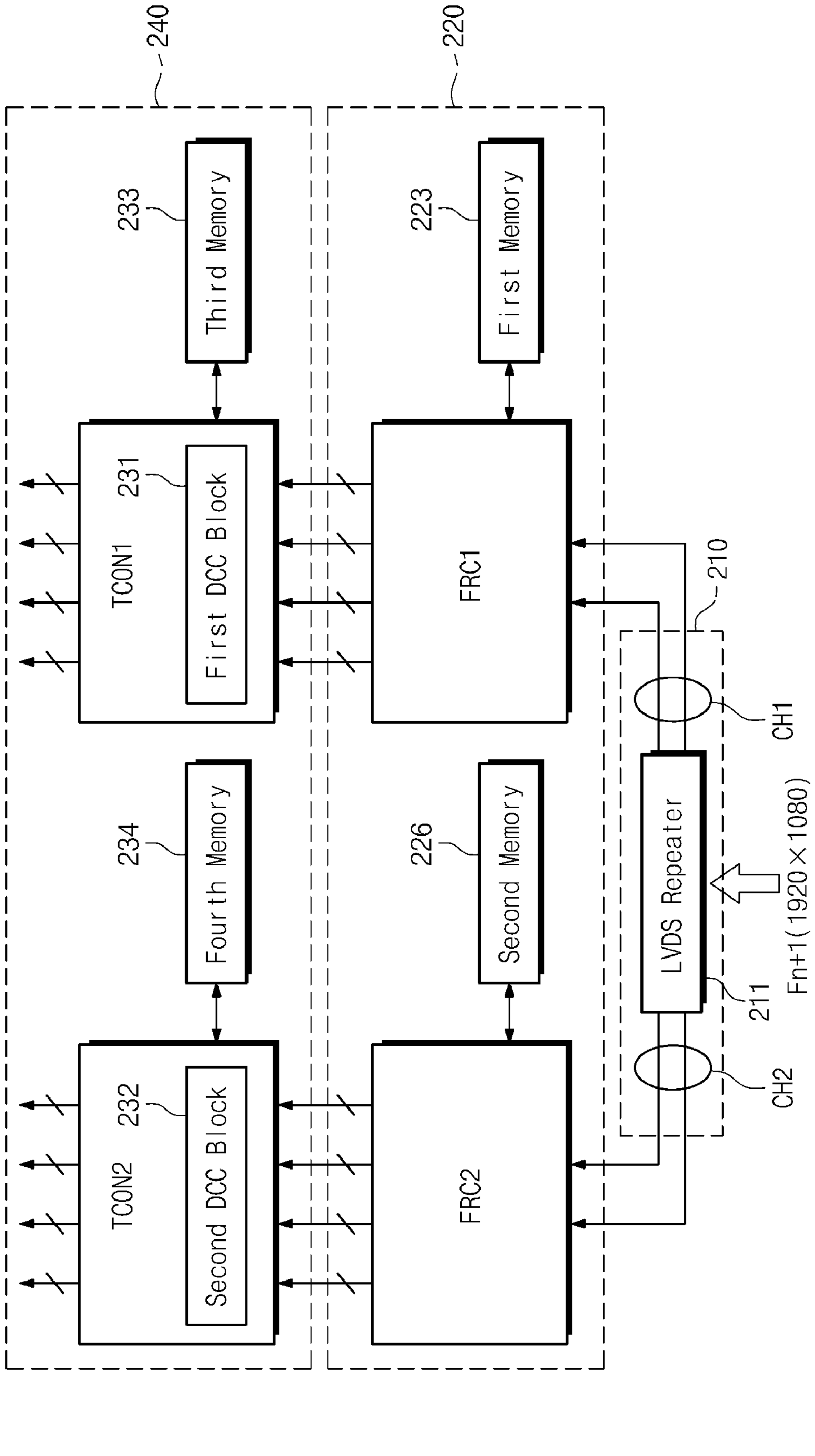
FIG. 10 is a block diagram showing a connecting structure of the interface unit, the frame rate control unit and a timing control unit.
Figure 11:
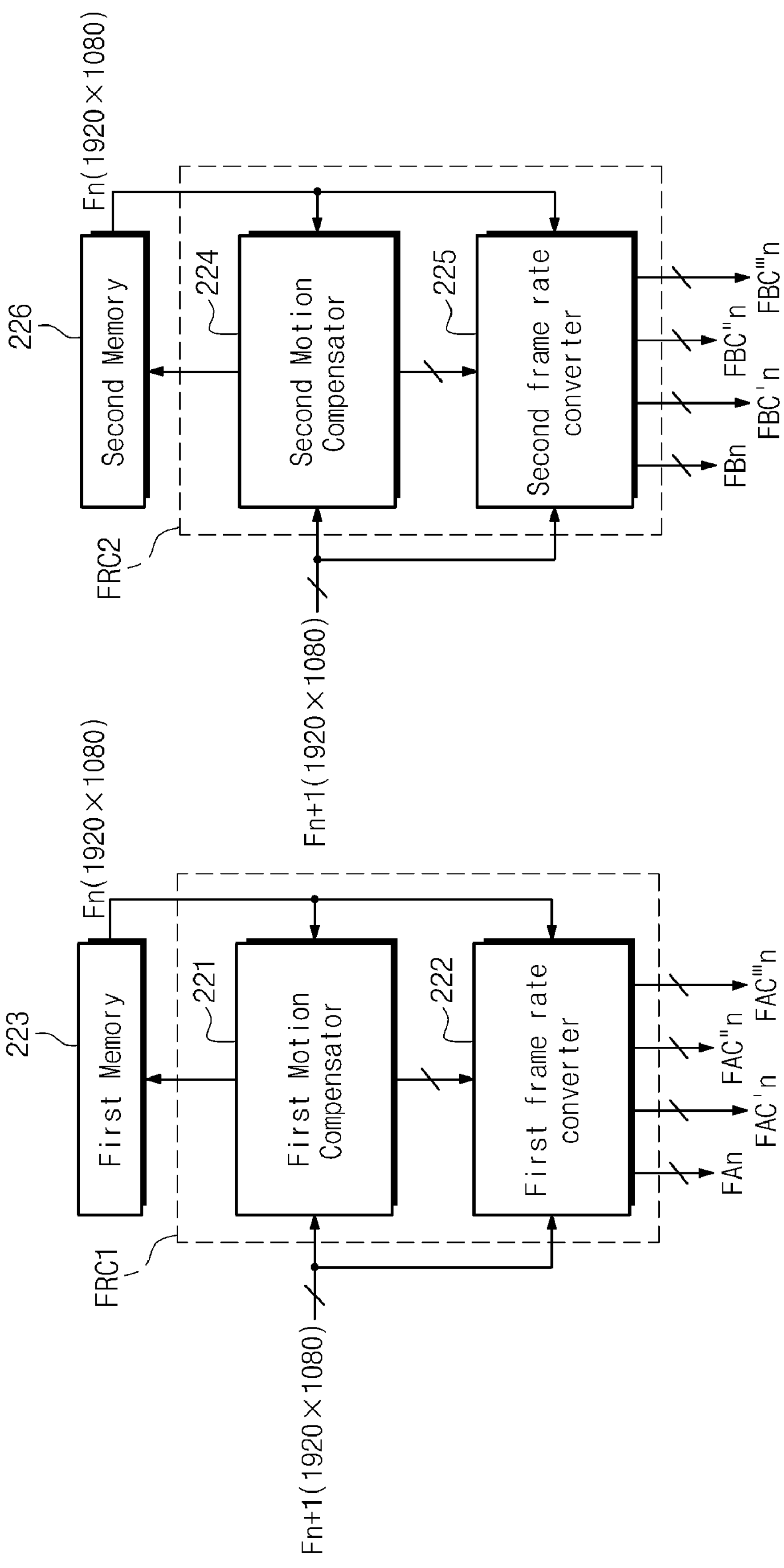
FIG. 11 is a block diagram showing internal structures of the first and second frame rate controllers shown in FIG. 10.

FIG. 10 is a block diagram showing a connecting structure of the interface unit, the frame rate control unit and a timing control unit. FIG. 11 is a block diagram showing internal structures of the first and second frame rate controllers shown in FIG. 10.

Referring to FIG. 10, the interface unit 210 includes LVDS repeater 211, a first channel part CH1 and a second channel part CH2. The LVDS repeater 211 receives the total image data (1920×1080) from the video system 50 (refer to FIG. 9) using the LVDS transmission scheme. The LVDS repeater 211 transmits the total image data (1920×1080) to the first frame rate controller FRC1 through the first channel part CH1, and transmits the total image data (1920×1080) to the second frame rate controller FRC2 through the second channel part CH2.

Referring to FIG. 11, the first frame rate controller FRC1 includes a first motion compensator 221 and a first frame rate converter 222, and the second frame rate controller FRC2 includes a second motion compensator 224 and a second frame rate converter 225.

The first motion compensator 221 receives a total image data (i.e. an $(N+1)^{th}$ frame data Fn+1(1920×1080)) corresponding to an $(N+1)^{th}$ frame and stores the $(N+1)^{th}$ frame data Fn+1(1920×1080) into a first memory 223. Then, the first motion compensator 221 also reads total image data (i.e. an $N^{th}$ frame data Fn(1920×1080)) corresponding to an $N^{th}$ frame from the first memory 223. The first motion compensator 221 also obtains a first motion vector using the $N^{th}$ frame data Fn(1920×1080) and the $(N+1)^{th}$ frame data Fn+1(1920×1080).

The first motion compensator 221 generates one or more first compensation data groups by motion-interpolating a first image data group FAn of the $N^{th}$ frame data Fn(1920×1080) corresponding to the first display area DA1 (refer to FIG. 9). Particularly, the first motion compensator 221 may generate three first compensation data groups FAC'n, FAC"n, and FAC'"n by operating the first image data group FAn and the obtained first motion vector.

In the present exemplary embodiment, a first group FAC'n of the three first compensation data groups FAC'n, FAC"n, and FAC'"n is calculated by adding the first image data group FAn to a value obtained multiplying the first motion vector by a first weight of about ¼. A second group FAC"n of the three first compensation data groups FAC'n, FAC"n, and FAC'"n is calculated by adding the first image data group FAn to a value obtained multiplying the first motion vector by a second weight of about 2/4. Also, a third group FAC'"n of the three first compensation data groups FAC'n, FAC"n, and FAC'"n is calculated by adding the first image data group FAn to a value obtained multiplying the first motion vector by a third weight of about 3/4. The three first compensation data groups FAC'n, FAC"n, and FAC'"n generated by the above method are transmitted to the first frame rate converter 222.

The first frame rate converter 222 outputs the first image data group FAn during the N$^{th}$ frame, and then sequentially outputs the three first compensation data groups FAC'n, FAC"n, and FAC'"n between the N$^{th}$ frame and (N+1) th frame. Consequently, the first frame rate converter 222 converts the image frame of 60 Hz into the image frame of 240 Hz.

Figure 12:
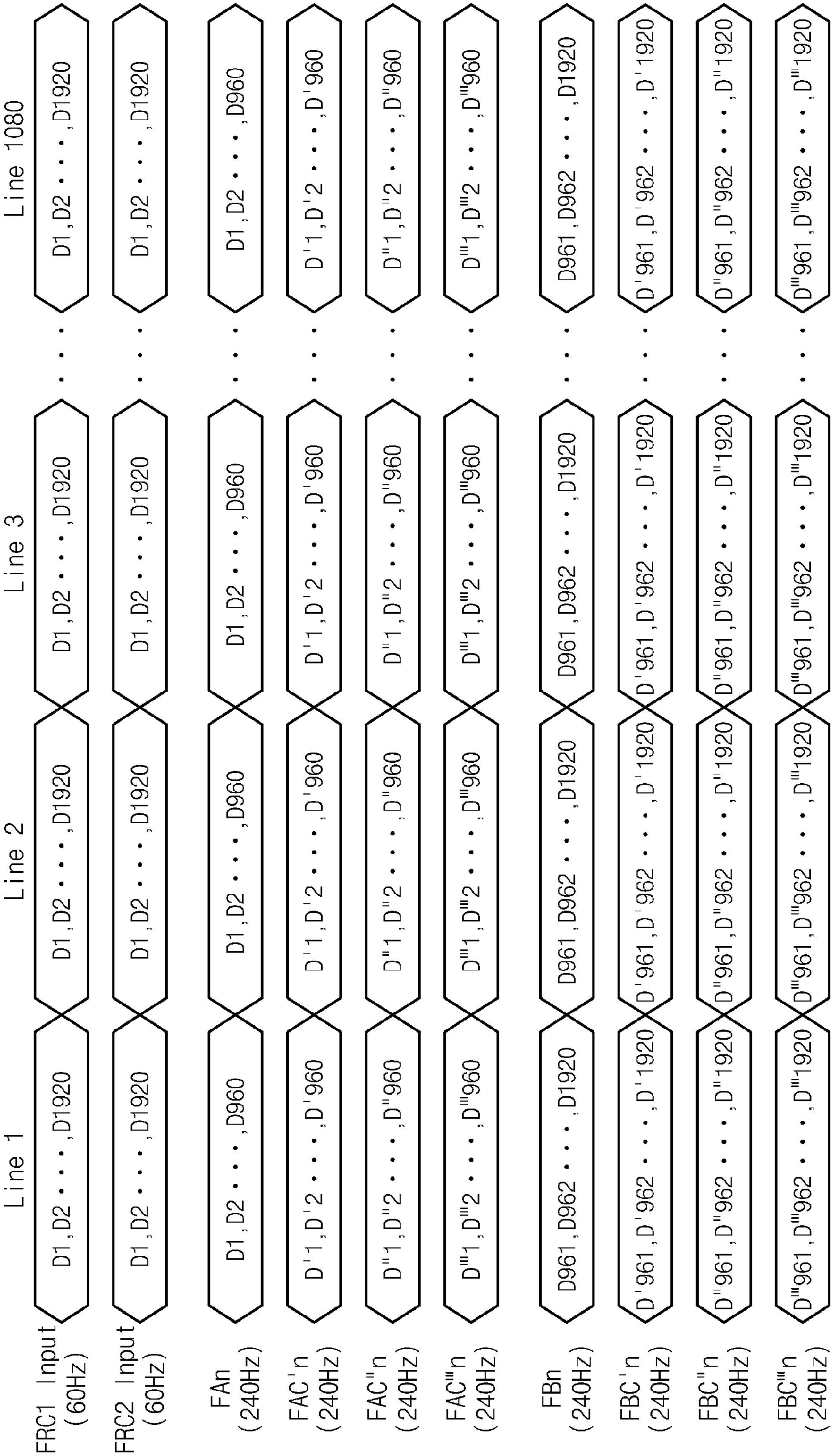
FIG. 12 is a block diagram showing functions of the first and second frame rate controllers shown in FIG. 10.

As shown in FIG. 12, the first frame rate controller FRC1 receives the N$^{th}$ frame data in a frequency of 60 Hz, and sequentially outputs the first image data group FAn, the first group FAC'n, the second group FAC"n, and the third group FAC'"n in a frequency of 240 Hz. Each of the first image data group FAn, the first group FAC'n, the second group FAC"n, and the third group FAC'"n includes (960×1080) image data, and is supplied to a first timing controller TCON1.

Since the second frame rate controller FRC2 shown in FIG. 11 has the same structure and function as those of the first frame rate controller FRC1, detailed descriptions of the second frame rate controller FRC2 will be omitted.

Referring again to FIG. 10, a timing control unit 240 is further arranged between the frame rate control unit 220 and the display unit 230. The timing control unit 240 includes n timing controllers. In the present exemplary embodiment, the timing control unit 240 includes a first timing controller TCON1 and a second timing controller TCON2, which are connected to the first frame rate controller FRC1 and the second frame rate controller FRC2, respectively.

The first timing controller TCON1 sequentially receives the first image data group FAn, the first group FAC'n, the second group FAC"n, and the third group FAC'"n from the first frame rate controller FRC1. The first timing controller TCON1 further includes a first DCC block (dynamic capacitance compensation) block 231. In order to improve a response speed of the liquid crystal, the first DCC (dynamic capacitance compensation) 231 performs overdriving for the first image data group FAn, the first group FAC'n, the second group FAC"n, and the third group FAC'"n. In order to perform the overdriving, since a previous frame data are required, the first timing controller TCON1 is connected to a third memory 233 storing the previous frame data therein.

The second timing controller TCON2 sequentially receives the second image data group FBn, a fourth group FBC'n, a fifth group FBC"n, and a sixth group FBC'"n from the second frame rate controller FRC2. The second timing controller TCON2 further includes a second DCC block 232. In order to improve a response speed of the liquid crystal, the first DCC block 232 performs the overdriving for the second image data group FBn, the fourth group FBC'n, the fifth group FBC"n, and the sixth group FBC'"n. In order to perform the overdriving, since the previous frame data are required, the second timing controller TCON2 is connected to a fourth memory 234 in which the previous frame data are stored.

Although not shown in the figures, the first frame rate controller FRC1 and the first timing controller TCON1 may be formed into one chip, and the second frame rate controller FRC2 and the second timing controller TCON2 may be formed into one chip. As described above, in case that the first frame rate controller FRC1 and the first timing controller TCON1 are formed into the one chip, a number of memories may be reduced.

Figure 13:
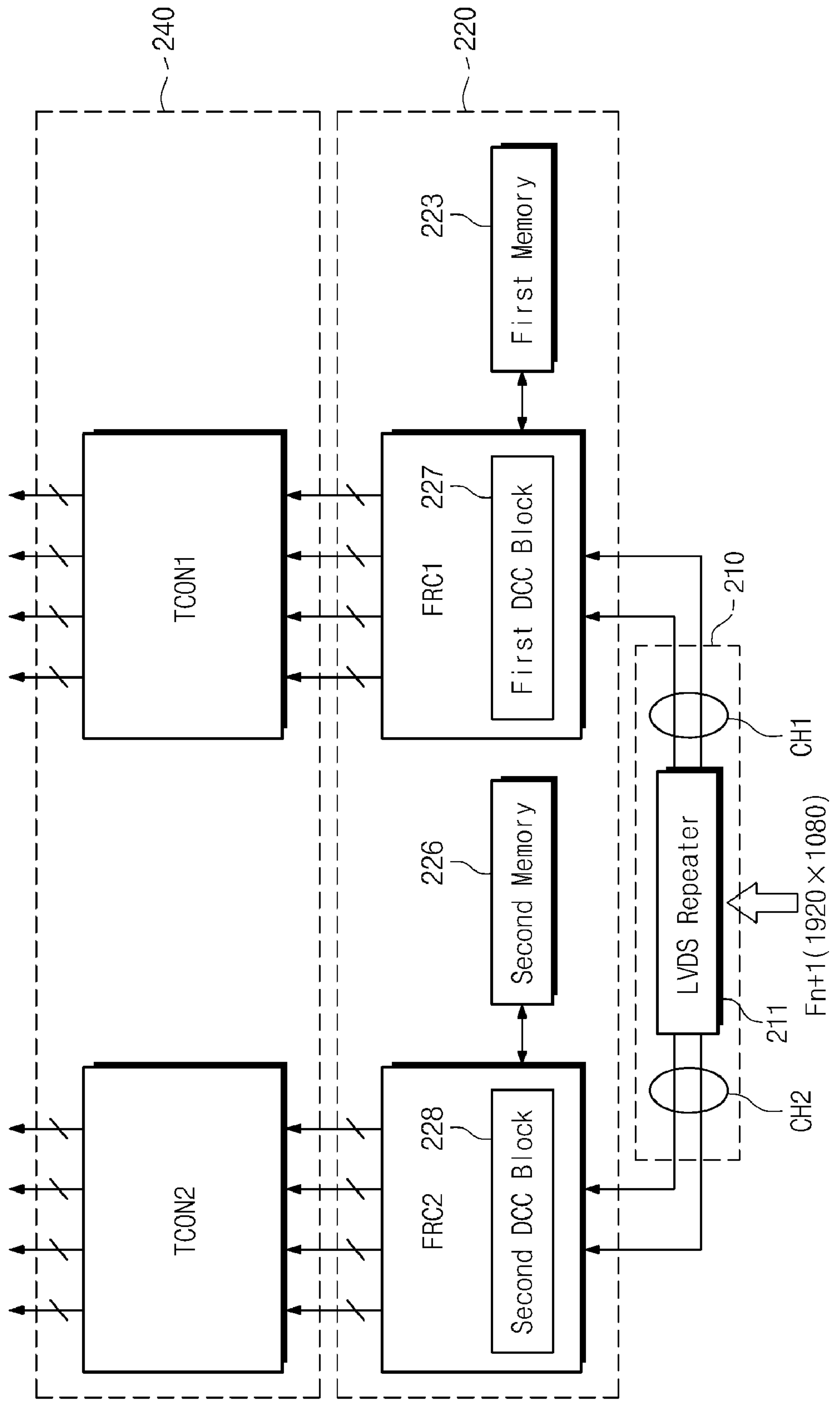
FIG. 13 is a block diagram showing a connecting structure of an interface unit, a frame rate control unit and a timing control unit according to another exemplary embodiment of the present invention.

FIG. 13 is a block diagram showing a connecting structure of an interface unit, a frame rate control unit and a timing control unit according to another exemplary embodiment of the present invention. In FIG. 13, the same reference numerals denote the same elements as shown in FIG. 10, and detailed descriptions of the same elements will be omitted to avoid redundancy.

Referring to FIG. 13, a first DCC block 227 is disposed in the first frame rate controller FRC1, and a second DCC block 228 is disposed in the second frame rate controller FRC2. The first frame rate controller FRC1 outputs a first image data group FAn, a first group FAC'n, a second group FAC"n, and a third group FAC'"n, each to which the overdriving is applied by the first DCC block 227. The second frame rate controller FRC2 outputs a second image data group FBn, a fourth group FBC'n, a fifth group FBC"n, and a sixth group FBC'"n, each to which the overdriving is applied by the second DCC block 228.

Since the frame rate control unit 220 includes a first memory 223 and a second memory 226 which are connected to the first and second frame rate controllers FRC1 and FRC2, respectively, although the first and second DCC blocks 227 and 228 are respectively disposed in the first and second frame rate controllers FRC1 and FRC2, a number of the memories in the frame rate control unit 220 does not increase. Accordingly, a number of the memories may be reduced in total compared with the above exemplary embodiment in which the first and second DCC blocks 227 and 228 are provided in the first and second timing controllers TCON1 and TCON2, respectively.

Figure 14:
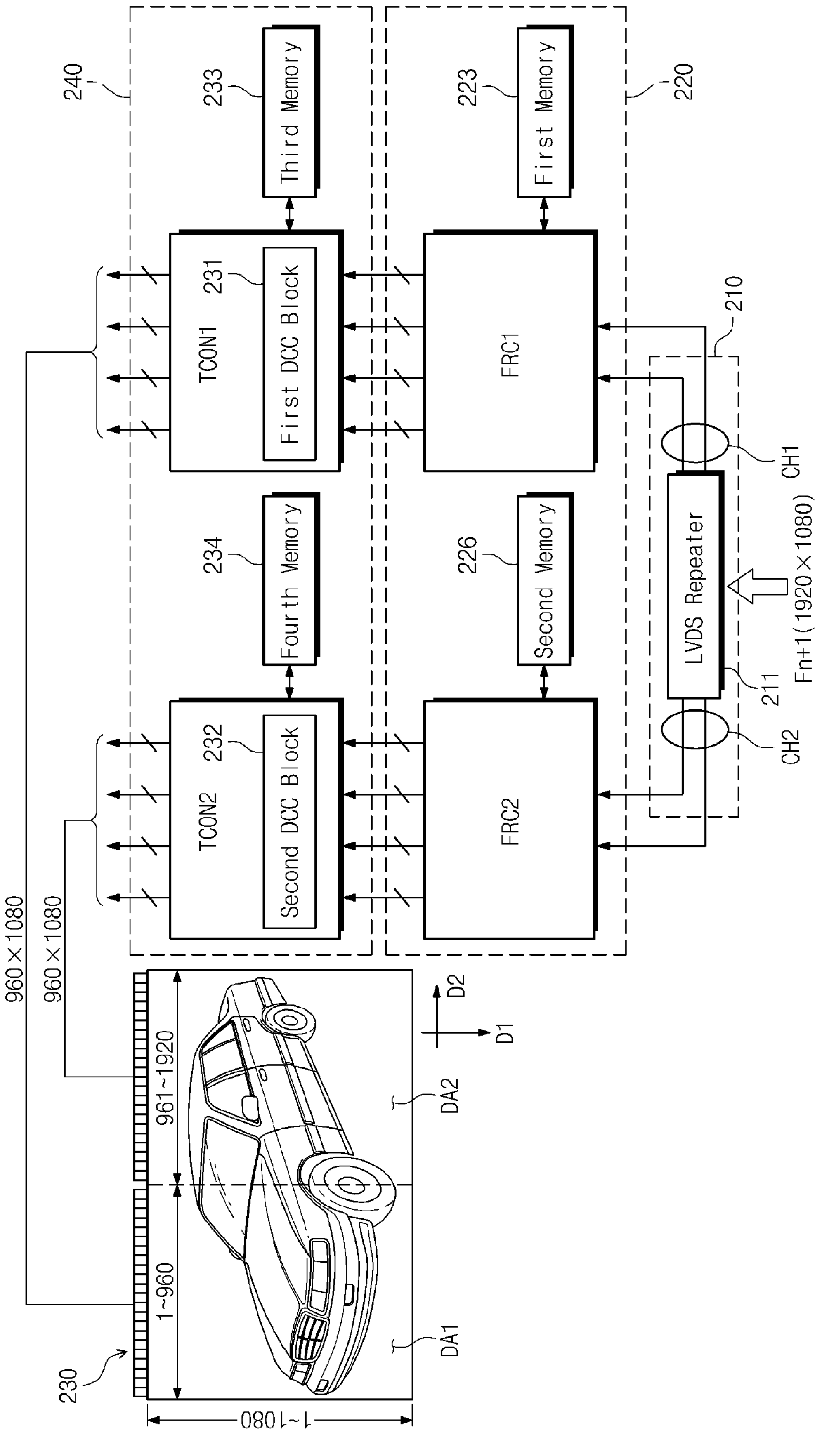
FIG. 14 is a block diagram showing an LCD including the elements shown in FIG. 10.

FIG. 14 is a block diagram showing an LCD including the elements shown in FIG. 10.

Referring to FIG. 14, a display unit 230 includes an LCD panel having the first and second display areas DA1 and DA2 defined by vertically dividing the LCD panel in the second direction D2. The LCD panel has a resolution of 1920×1080, and each of the first and second display areas DA1 and DA2 has a resolution of 960×1080. The first display area DA1 receives signals from the first timing controller TCON1, and the second display area DA2 receives signals from the second timing controller TCON2.

Particularly, the first timing controller TCON1 sequentially outputs a first image data group FAn, a first group FAC'n, a second group FAC"n, and a third group FAC'"n in the first display area DA1. The second timing controller TCON2 sequentially outputs a second image data group FBn, a fourth group FBC'n, a fifth group FBC"n, and a sixth group FBC'"n in the second display area DA2.

Therefore, the first display area DA1 may display three intermediate image corresponding to the first to third groups FAC'n, FAC"n, and FAC'"n between the N$^{th}$ frame and the (N+1)$^{th}$ frame, and the second display area DA2 may display three intermediate image corresponding to the fourth to sixth groups FBC'n, FBC"n, and FBC'"n between the N$^{th}$ frame and the (N+1)$^{th}$ frame.

In this case, the first and second timing controllers TCON1 and TCON2 are synchronized with each other by a synchronization signal so as to simultaneously output the signals. As a result, the first and second display areas DA1 and DA2 may simultaneously display images.

However, the LCD panel should not be limited to a structure divided in a vertical direction as shown in FIG. 14.

Figure 15:
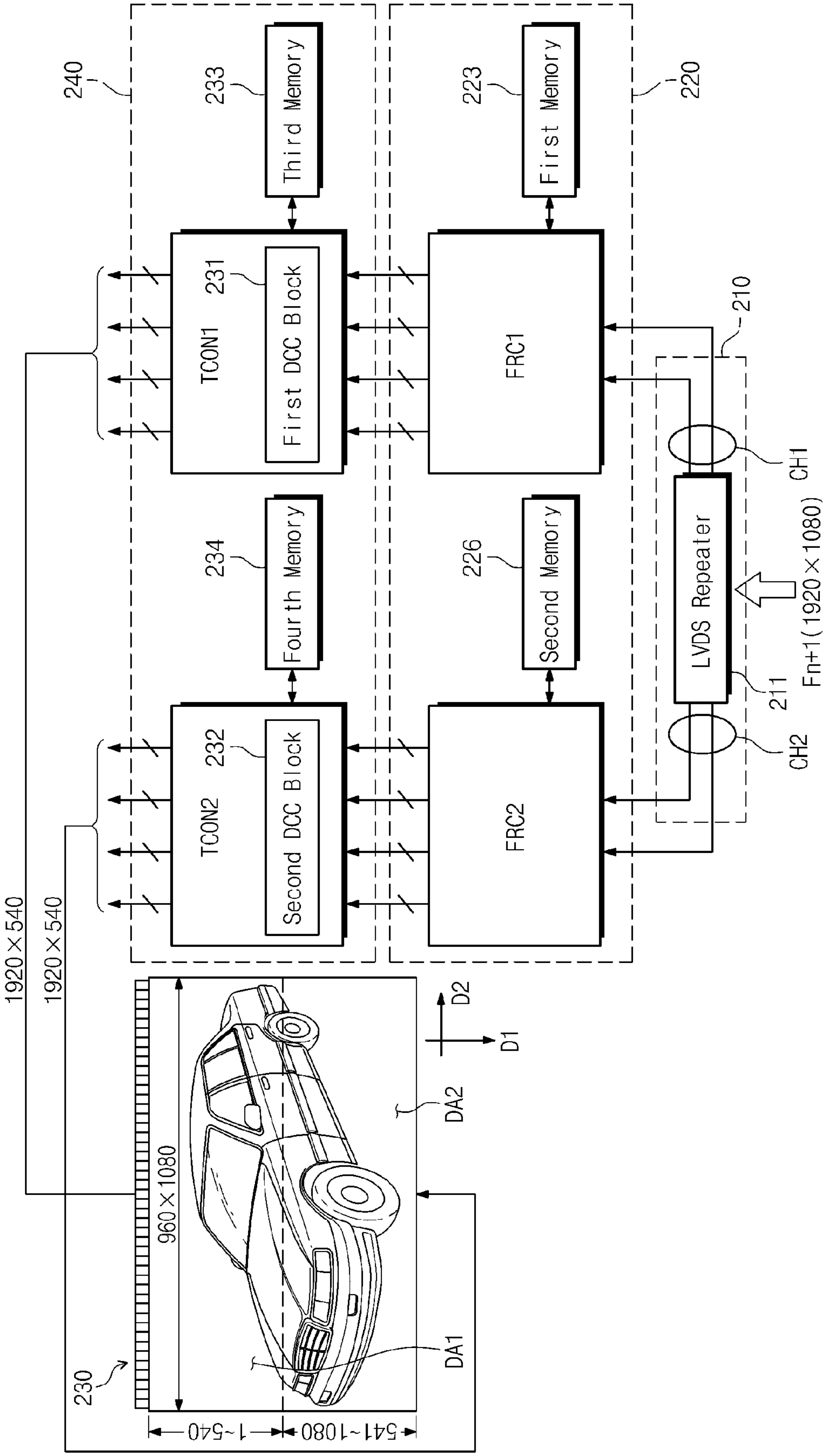
FIG. 15 is a block diagram showing another exemplary embodiment of LCD having a display unit horizontally divided according to the present invention.

FIG. 15 is a block diagram showing another exemplary embodiment of LCD having a display unit horizontally divided according to the present invention.

Referring to FIG. 15, a display unit 250 includes an LCD panel having a first display area DA1 and a second display area DA2 defined by horizontally dividing the LCD panel in a first direction D1. The LCD panel has a resolution of 1920×1080, and each of the first and second display areas DA1 and DA2 has a resolution of 1920×540. The first display area DA1 receives signals from the first timing controller TCON1, and the second display area DA2 receives signals from the second timing controller TCON2.

Particularly, the first timing controller TCON1 sequentially outputs a first image data group FAn, a first group FAC'n, a second group FAC"n, and a third group FAC'"n to the first display area DA1. The second timing controller TCON2 sequentially outputs a second image data group FBn, a fourth group FBC'n, a fifth group FBC"n, and a sixth group FBC'"n to the second display area DA2.

Accordingly, the first display area DA1 may display three intermediate image corresponding to the first to third groups FAC'n, FAC"n, and FAC'"n between the $N^{th}$ frame and the $(N+1)^{th}$ frame, and the second display area DA2 may display three intermediate image corresponding to the fourth to sixth groups FBC'n, FBC"n, and FBC'"n between the $N^{th}$ frame and the $(N+1)^{th}$ frame.

However, the LCD panel should not be limited to the structure divided in a vertical direction or a horizontal direction as shown in FIG. 14 and FIG. 15.

Figure 16:
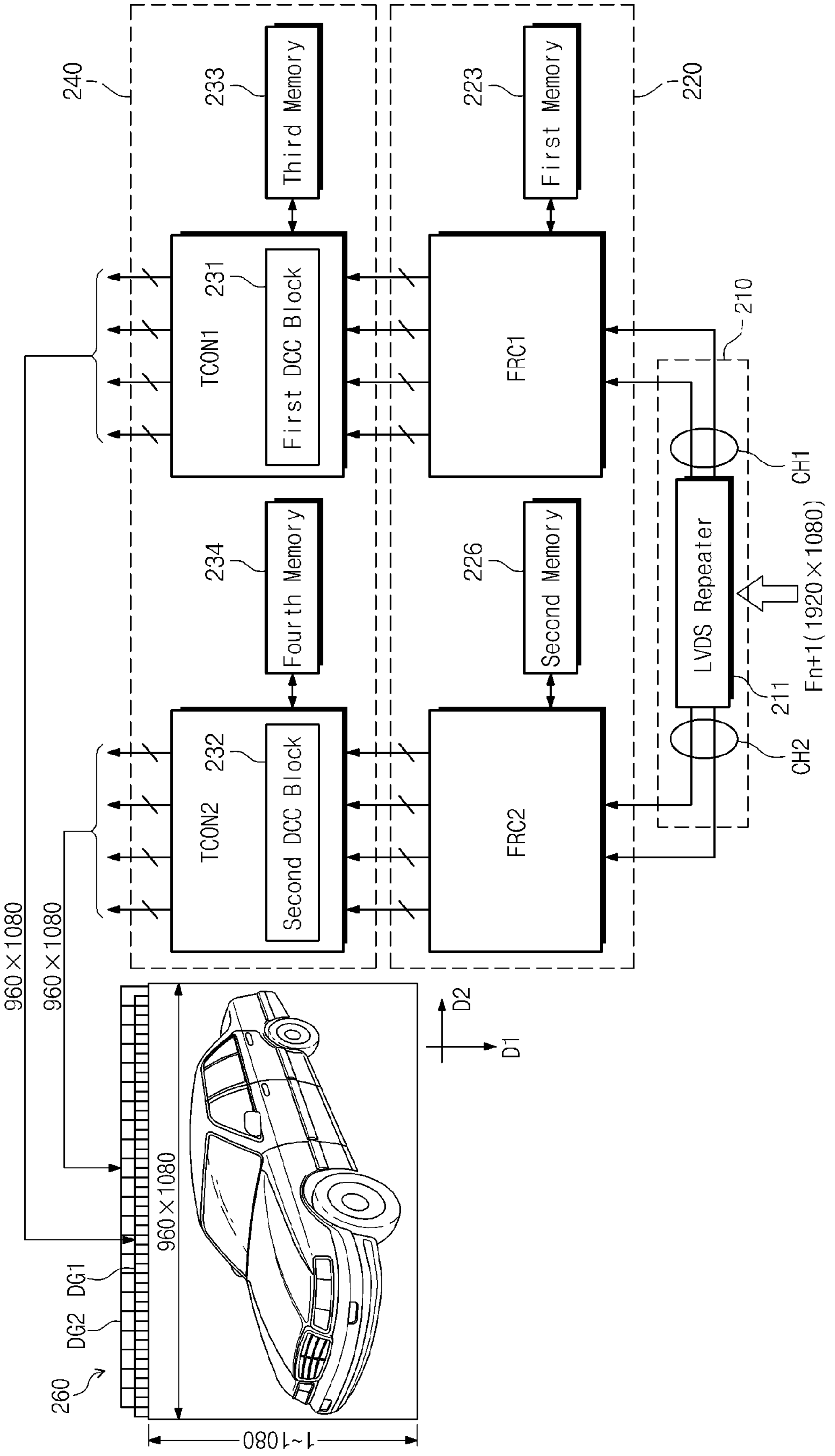
FIG. 16 is a block diagram showing another exemplary embodiment of LCD according to the present invention.

FIG. 16 is a block diagram showing another exemplary embodiment of LCD according to the present invention.

Referring to FIG. 16, a display unit 260 includes a LCD panel having a resolution of 1920×1080. The LCD panel includes 1920 gate lines and 1080 data lines. The 1080 data lines are divided into a first data group DG1 having odd-numbered data lines and a second data group DG2 having even-numbered data lines.

In this case, the first data group DG1 sequentially receives a first image data group FAn, a first group FAC'n, a second group FAC"n, and a third group FAC'"n from a first timing controller TCON1, and the second data group DG2 sequentially receives a second image data group FBn, a fourth group FBC'n, a fifth group FBC"n, and a sixth group FBC'"n.

As described above, the LCD controls the LCD panel using the motion interpolation technology and frame rate control technology, so that motion blurring in which objects are blurred when moving images are displayed may be prevented.

Further, in order to perform the motion interpolation, the frame rate controllers provided in the LCD receives the total image data, thereby accurately performing the motion interpolation and preventing display defects of the intermediate images displayed on corresponding display areas.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus, comprising:

a display panel comprising n display areas where n represents a natural number equal to or larger than 2;

an interface unit to output n image data groups comprising a first image data group corresponding to a first display area, and a second image data group corresponding to a second display area adjacent to the first display area; and n frame rate controllers comprising a first frame rate controller to generate a first motion-compensated intermediate image in response to the first image data group, and a second frame rate controller to generate a second motion-compensated intermediate image in response to the second image data group;

wherein the first display area displays the first motion-compensated intermediate image and the second display area displays the second motion-compensated intermediate image, and wherein the first frame rate controller generates the first motion-compensated intermediate image based on second image information corresponding to the second display area and transmitted from the second frame rate controller, and the second frame rate controller generates the second motion-compensated intermediate image based on first image information corresponding to the first display area and transmitted from the first frame rate controller.

2. The display apparatus of claim 1, wherein the display panel has a resolution of (n×i)×j, where (n×i) denotes a number of horizontal pixels and j denotes a number of vertical pixels.

3. The display apparatus of claim 2, wherein (n×i) is in the range of 3840 to 4096 and j is 2160.

4. The display apparatus of claim 3, wherein each display area has a resolution of (i×j).

5. The display apparatus of claim 4, wherein n is 4 and i is 1024.

6. The display apparatus of claim 2, wherein the first display area comprises a first area and a first boundary area adjacent to the first area, and the second display area comprises a second boundary area adjacent to the first boundary area and a second area adjacent to the second boundary area, and wherein each of the first boundary area and the second boundary area has a resolution of (k×j), where k denotes a natural number smaller than i.

7. The display apparatus of claim 6, wherein k is in the range of 32 to 64.

8. The display apparatus of claim 6, wherein the first image information comprises a first boundary data group corresponding to the first boundary area and a first motion vector representing motion information of an object shifted to the first boundary area from the first area, and the second image information comprises a second boundary data group corresponding to the second boundary area and a second motion vector representing motion information of the object shifted to the second boundary area from the second area.

9. The display apparatus of claim 8, wherein the first frame rate controller comprises:

a first boundary data detector to detect the first boundary data group from the first image data group of a present frame and to transmit the first boundary data group to the second frame rate controller;

a first motion compensation unit to obtain the first motion vector based on the first image data group of the present frame, a first image data group of a next frame, and the second boundary data group transmitted from the second frame rate controller, and to generate a first compensation data group, for which motion compensation has been performed, based on the first motion vector; and a first frame rate converter to generate the first motion-compensated intermediate image in response to the first compensation data group and to insert the first motion-compensated intermediate image between the present frame and the next frame.

10. The display apparatus of claim 9, wherein the second frame rate controller comprises:

a second boundary data detector to detect the second boundary data group from the second image data group of the present frame and to transmit the second boundary data group to the first motion compensation unit;

a second motion compensation unit to obtain the second motion vector based on the second image data group of the present frame, a second image data group of the next frame, and the first boundary data group transmitted from the first boundary data detector, and to generate a second compensation data group, for which motion compensation has been performed, based on the second motion vector; and a second frame rate converter to generate the second motion-compensated intermediate image in response to the second compensation data group and to insert the second motion-compensated intermediate image between the present frame and the next frame.

11. The display apparatus of claim 1, wherein the first frame rate controller and the second frame rate controller exchange the first image information and the second image information through a serial transmission scheme.

12. The display apparatus of claim 1, wherein the interface unit receives the n image data groups through a low voltage differential signaling (LVDS) transmission scheme.

13. The display apparatus of claim 1, wherein the first motion-compensated intermediate image and the second intermediate motion-compensated image have a frame frequency of 120 Hz.

14. The display apparatus of claim 1, wherein the display panel is a liquid crystal display panel.

* * * * *